(12) United States Patent
Inaba et al.

(10) Patent No.: US 11,168,741 B2
(45) Date of Patent: Nov. 9, 2021

(54) DOG CLUTCH FOR VEHICLE

(71) Applicant: TOYOTA JIDOSHA KABUSHIKI KAISHA, Toyota (JP)

(72) Inventors: Yukihiro Inaba, Nisshin (JP); Akihiko Ichikawa, Toyota (JP); Tomoyasu Kurimoto, Aichi-gun (JP); Takeshi Kamiya, Anjo (JP); Yuuki Masui, Anjo (JP); Isamu Shiotsu, Nagakute (JP); Yasumitsu Osada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/792,976

(22) Filed: Feb. 18, 2020

(65) Prior Publication Data

US 2020/0284302 A1  Sep. 10, 2020

(30) Foreign Application Priority Data

Mar. 6, 2019  (JP) .............................. JP2019-040603

(51) Int. Cl.
    *F16D 11/14*    (2006.01)
    *F16D 13/64*    (2006.01)
    *F16D 11/00*    (2006.01)

(52) U.S. Cl.
    CPC .............. *F16D 11/14* (2013.01); *F16D 13/64* (2013.01); *F16D 2011/008* (2013.01); *F16D 2013/642* (2013.01)

(58) Field of Classification Search
    CPC ..................................................... F16D 11/14
    See application file for complete search history.

(56) References Cited

U.S. PATENT DOCUMENTS

| | | | | |
|---|---|---|---|---|
| 5,098,343 | A | * | 3/1992 | Tysver .................... F16D 1/101 403/315 |
| 2017/0051811 | A1 | * | 2/2017 | Takeuchi ................ F16H 63/30 |
| 2018/0073599 | A1 | * | 3/2018 | Yoshimura ............. F16H 3/097 |
| 2018/0073635 | A1 | | 3/2018 | Takeuchi et al. |

FOREIGN PATENT DOCUMENTS

| | | |
|---|---|---|
| CN | 205118043 U | 3/2016 |
| CN | 107816514 A | 3/2018 |
| DE | 10 2017 121 164 A1 | 3/2018 |
| JP | 2016-176529 A | 10/2016 |
| JP | 2018-044613 A | 3/2018 |

* cited by examiner

*Primary Examiner* — Stacey A Fluhart
(74) *Attorney, Agent, or Firm* — Oblon, McClelland, Maier & Neustadt, L.L.P.

(57) ABSTRACT

A dog clutch for a vehicle includes gear-side meshing teeth provided on a shifting gear fitted so as to be rotatable relative to a shaft, and a dog ring disposed adjacent to the shifting gear in the axial direction of the shaft. The dog ring includes a first ring, a second ring, and springs interposed between the two rings. The first ring is provided with meshing teeth that can be meshed with the gear-side meshing teeth of the shifting gear. The second ring is provided with meshing teeth that can be meshed with the gear-side meshing teeth of the shifting gear. The springs are provided on the inner peripheral side of a circle that is centered on a rotational axis and that circumscribes a portion of the meshing teeth of the first ring and the second ring positioned on the outermost peripheral side.

6 Claims, 9 Drawing Sheets

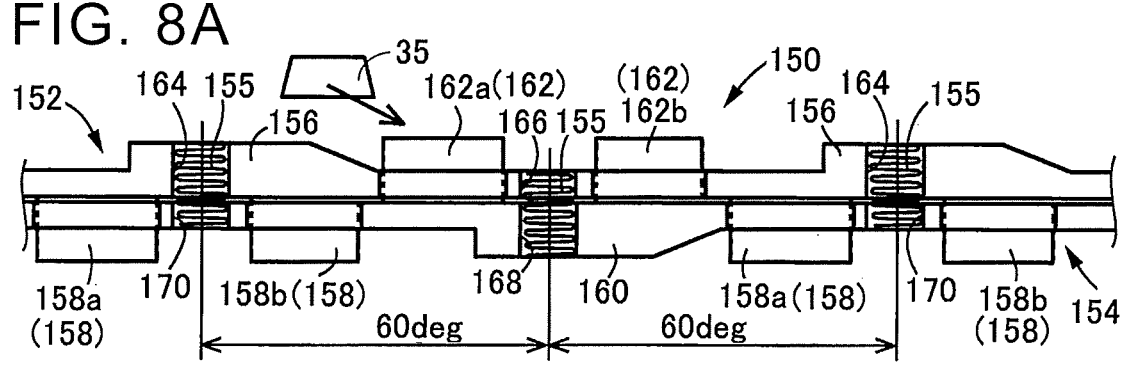
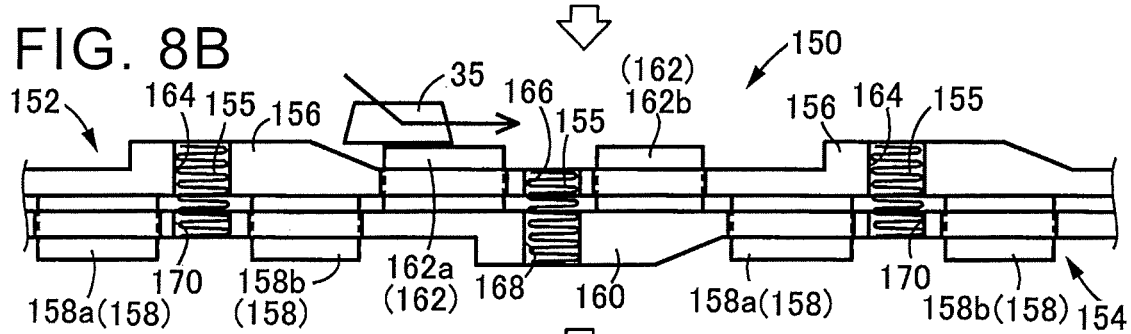
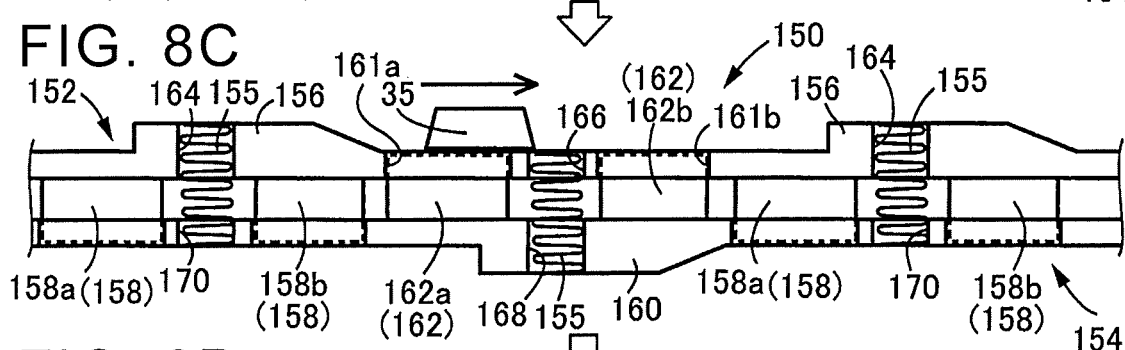
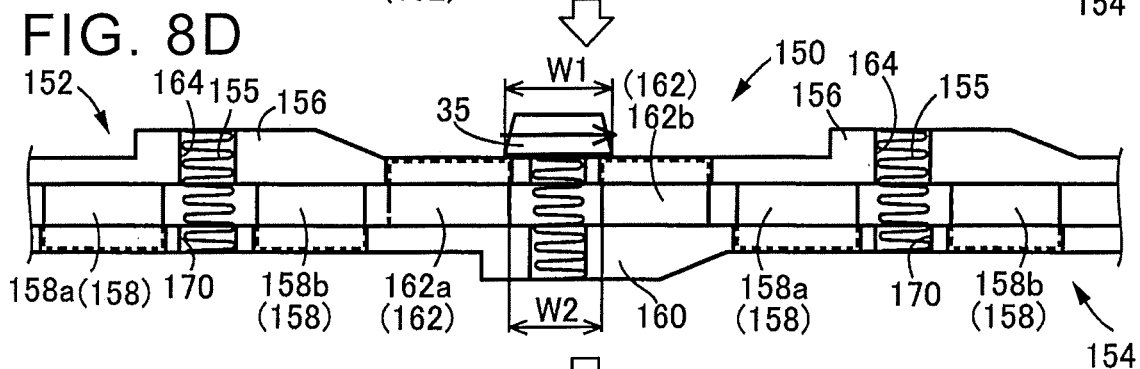
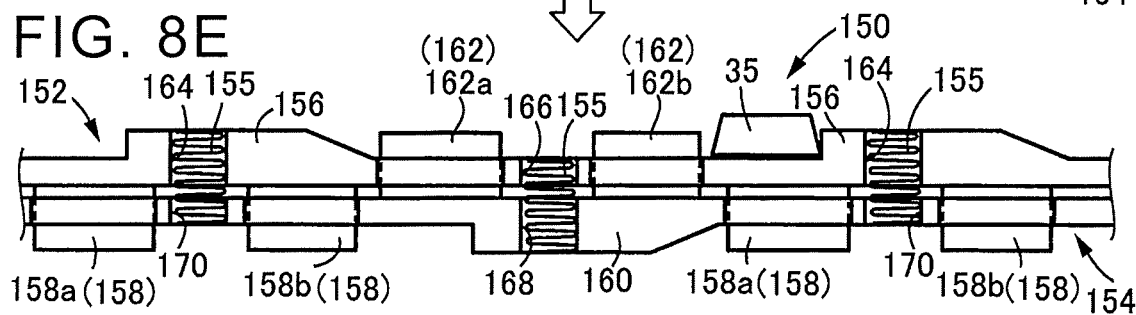

DOG CLUTCH FOR VEHICLE

CROSS-REFERENCE TO RELATED APPLICATIONS

This application claims priority to No. 2019-040603 filed on Mar. 6, 2019, incorporated herein by reference in its entirety.

BACKGROUND

1. Technical Field

The present disclosure relates to the structure of a dog clutch provided in a vehicle.

2. Description of Related Art

There is known a dog clutch provided in a vehicle and configured to include gear-side meshing teeth provided on a shifting gear fitted so as to be rotatable relative to a shaft and a dog ring disposed adjacent to the shifting gear in the axial direction of the shaft. Japanese Unexamined Patent Application Publication No. 2018-44613 (JP 2018-44613 A) describes a vehicle transmission that includes the dog clutch described above. The dog ring (switching mechanism) described in JP 2018-44613 A is provided so as to be non-rotatable relative to a shaft and relatively movable in the axial direction of the shaft. The dog ring is provided with meshing teeth that can be meshed with gear-side meshing teeth of a shifting gear. When the dog ring is moved toward the shifting gear in the axial direction of the shaft, the shaft and the shifting gear are connected to each other via the dog clutch such that power can be transferred therebetween with the gear-side meshing teeth of the shifting gear and the meshing teeth of the dog ring meshed with each other.

The dog ring (switching mechanism) according to JP 2018-44613 A is configured to include a first ring in a disk shape, a second ring in a disk shape, and a plurality of springs interposed between the first ring and the second ring. The first ring is disposed adjacent to the shifting gear in the axial direction of the shaft. The second ring is disposed with the first ring between the shifting gear and the second ring in the axial direction of the shaft. The first ring is provided with first meshing teeth that project toward the shifting gear and that can be meshed with the gear-side meshing teeth of the shifting gear. The second ring is provided with second meshing teeth that project toward the shifting gear while penetrating the first ring and that can be meshed with the gear-side meshing teeth of the shifting gear.

SUMMARY

In the dog ring (switching mechanism) according to JP 2018-44613 A, the springs which are interposed between the first ring and the second ring are disposed on the outer peripheral side with respect to the first meshing teeth of the first ring and the second meshing teeth of the second ring. Thus, the outside diameter of the dog ring is increased by an amount corresponding to the springs being disposed on the outer peripheral side with respect to the first meshing teeth and the second meshing teeth, which increases the size of the dog ring.

The present disclosure provides a dog clutch configured to include gear-side meshing teeth provided on a shifting gear and a dog ring disposed adjacent to the shifting gear, the dog clutch being structured such that an increase in the size of the dog ring can be suppressed.

An aspect of the present disclosure relates to a dog clutch for a vehicle, the dog clutch including gear-side meshing teeth and a dog ring. The gear-side meshing teeth are provided on a shifting gear fitted so as to be rotatable relative to a shaft. The dog ring is disposed adjacent to the shifting gear in an axial direction of the shaft, and non-rotatable relative to the shaft. The dog ring includes a first ring that is relatively movable in the axial direction of the shaft, a second ring disposed with the first ring interposed between the shifting gear and the second ring in the axial direction of the shaft, the second ring non-rotatable relative to the shaft and relatively movable in the axial direction of the shaft, and a spring interposed between the first ring and the second ring. The first ring is provided with first meshing teeth that project toward the shifting gear in the axial direction of the shaft and that are configured to be meshed with the gear-side meshing teeth of the shifting gear. The second ring is provided with second meshing teeth that project toward the shifting gear while penetrating the first ring in the axial direction of the shaft and that are configured to be meshed with the gear-side meshing teeth of the shifting gear. The spring is provided on an inner peripheral side with respect to a circle that is centered on the shaft and that circumscribes a portion of the first meshing teeth of the first ring and the second meshing teeth of the second ring positioned on an outermost peripheral side from a center of the shaft.

With the dog clutch for a vehicle according to the aspect of the present disclosure, the spring which is interposed between the first ring and the second ring is provided on the inner peripheral side of the circle which circumscribes a portion of the first meshing teeth of the first ring and the second meshing teeth of the second ring positioned on the outermost peripheral side from the center of the shaft. Therefore, the spring is not provided on the outer peripheral side with respect to the first meshing teeth and the second meshing teeth, and the outside diameter of the dog ring can be reduced accordingly. Hence, the weight and the cost of the dog ring can be reduced.

In the dog clutch for a vehicle according to the aspect described above, the spring may be provided inside the first meshing teeth of the first ring.

With the dog clutch for a vehicle configured as described above, the spring is provided inside the first meshing teeth of the first ring. Therefore, the spring is not provided on the outer peripheral side with respect to the first meshing teeth, and the outside diameter of the dog ring can be reduced accordingly. Hence, the weight and the cost of the dog ring can be reduced.

In the dog clutch for a vehicle according to the aspect described above, the first meshing teeth of the first ring and the second meshing teeth of the second ring may be positioned away from each other in a rotational direction in an assembled state; an inclined surface may be provided on the second meshing teeth of the second ring toward a rearward rotational direction in the rotational direction; and the spring may be provided between the first meshing teeth of the first ring and the second meshing teeth of the second ring in the rotational direction.

With the dog clutch for a vehicle configured as described above, the first meshing teeth and the second meshing teeth are positioned away from each other in the rotational direction in the assembled state, which makes it possible to provide the spring between the first meshing teeth and the second meshing teeth. Since the first meshing teeth and the second meshing teeth are positioned away from each other in the rotational direction, on the other hand, it is conceivable that the gear-side meshing teeth are meshed with the second meshing teeth, and not meshed with the first meshing teeth, in a transient period of engagement of the dog clutch. In order to address this issue, an inclined surface is provided on the second meshing teeth toward the rearward rotational direction in the rotational direction. Therefore, when the gear-side meshing teeth contact the second meshing teeth in a transient period of engagement of the dog clutch, the second meshing teeth are pushed down by the gear-side meshing teeth with the gear-side meshing teeth abutting against the inclined surface of the second meshing teeth. Thus, the gear-side meshing teeth can be relatively rotated with respect to the second meshing teeth, and the gear-side meshing teeth can be meshed with the first meshing teeth.

In the dog clutch for a vehicle according to the aspect described above, the second meshing teeth of the second ring may each be constituted from a first split tooth and a second split tooth split in a rotational direction; and the spring may be provided between the first split tooth and the second split tooth in the rotational direction.

With the dog clutch for a vehicle configured as described above, the second meshing teeth of the second ring are constituted from the first split tooth and the second split tooth, and thus the spring can be provided between the first split tooth and the second split tooth.

In the dog clutch for a vehicle according to the aspect described above, the dog ring may include a plurality of the spring and the number of the springs may be three, or may include a plurality of the spring and the number of the springs may be six.

With the dog clutch for a vehicle configured as described above, three or six springs are disposed at equal intervals over the circumference in the dog ring. Thus, the first ring and the second ring can be coupled to each other, and the first ring and the second ring can be stably biased in the direction of drawing each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a development view in which a part of the dog ring in FIG. 7 in the circumferential direction is developed in plan, chronologically illustrating a state in a transient period in which gear-side meshing teeth are meshed with first meshing teeth of a first dog ring with an engine in a driving state;

FIG. 8B is a development view in which a part of the dog ring in FIG. 7 in the circumferential direction is developed in plan, chronologically illustrating a state in the transient period in which the gear-side meshing teeth are meshed with the first meshing teeth of the first dog ring with the engine in the driving state;

FIG. 8C is a development view in which a part of the dog ring in FIG. 7 in the circumferential direction is developed in plan, chronologically illustrating a state in the transient period in which the gear-side meshing teeth are meshed with the first meshing teeth of the first dog ring with the engine in the driving state;

FIG. 8D is a development view in which a part of the dog ring in FIG. 7 in the circumferential direction is developed in plan, chronologically illustrating a state in the transient period in which the gear-side meshing teeth are meshed with the first meshing teeth of the first dog ring with the engine in the driving state;

FIG. 8E is a development view in which a part of the dog ring in FIG. 7 in the circumferential direction is developed in plan, chronologically illustrating a state in the transient period in which the gear-side meshing teeth are meshed with the first meshing teeth of the first dog ring with the engine in the driving state.

DETAILED DESCRIPTION OF EMBODIMENTS

Figure 1:
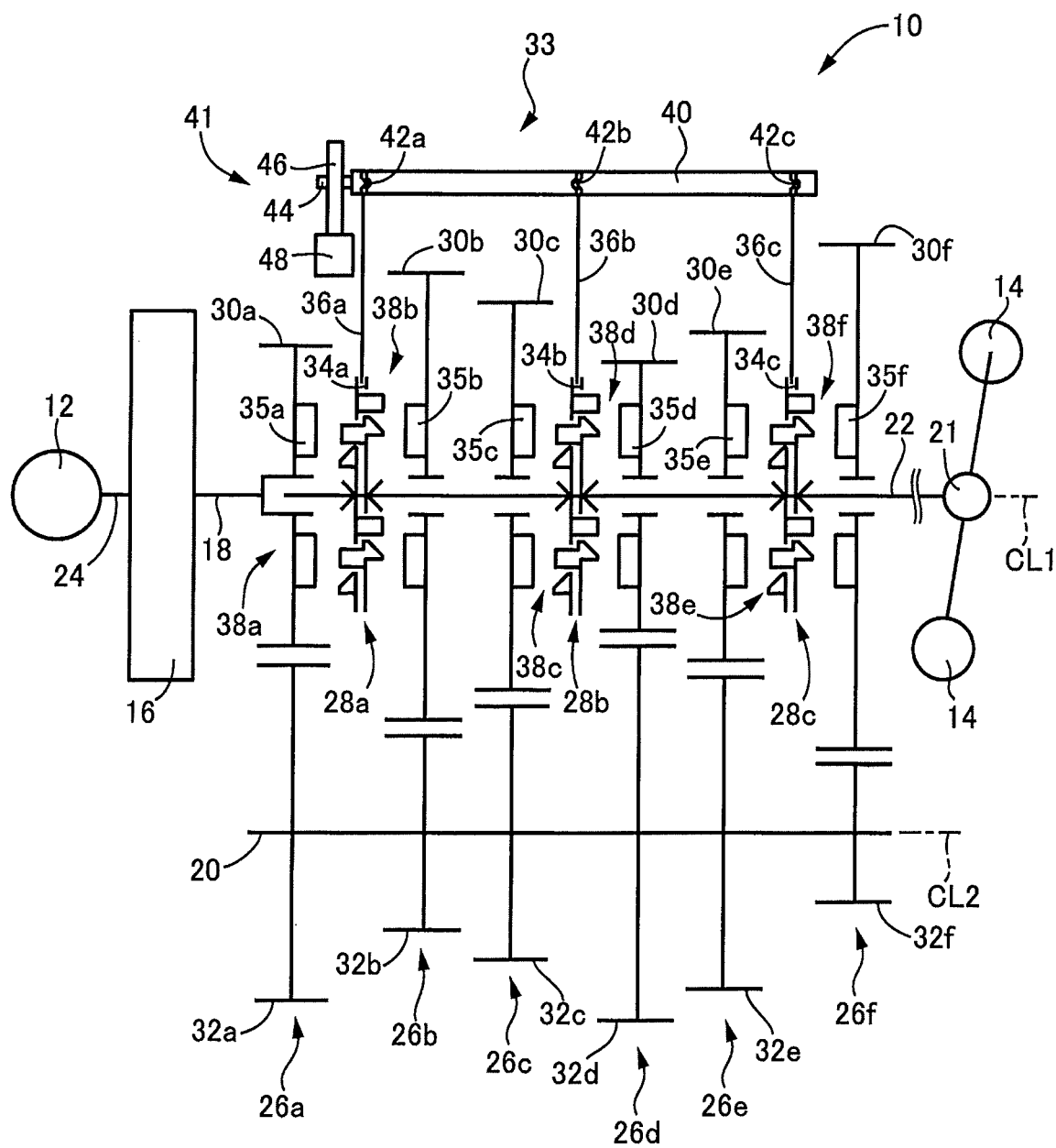
FIG. 1 is a skeleton diagram schematically illustrating the structure of a vehicle transmission according to a first embodiment of the present disclosure.

Embodiments of the present disclosure will be described in detail below with reference to the drawings. In the drawings, the embodiments described below are simplified or deformed as appropriate, and the dimensional ratios, shapes, etc. of various portions are not necessarily exact.

FIG. 1 is a skeleton diagram schematically illustrating the structure of a vehicle transmission 10 (hereinafter referred to as a "transmission 10") according to a first embodiment of the present disclosure. The transmission 10 is a parallel two-axis transmission that is provided on a power transfer path between an engine 12 and drive wheels 14 and that establishes a plurality of gear stages (shift speeds) by reducing or increasing the speed of rotation input from the engine 12 at a predetermined speed ratio γ.

The transmission 10 includes an input shaft 18 coupled to the engine 12 via a clutch 16 such that power can be transferred therebetween, a counter shaft 20 disposed in parallel with the input shaft 18, and an output shaft 22 coupled to the drive wheels 14 via a differential mechanism 21 etc. such that power can be transferred therebetween. The input shaft 18 and the output shaft 22 are disposed in series on a rotational axis CL1 as with a crankshaft 24 of the engine 12. The output shaft 22 is an example of the shaft according to the present disclosure.

The transmission 10 includes an input gear pair 26a, a second speed gear pair 26b, a third speed gear pair 26c, a sixth speed gear pair 26d, a fourth speed gear pair 26e, and a first speed gear pair 26f, which are arranged sequentially from the engine 12 toward the drive wheels 14 in the direction of the rotational axis CL1.

The transmission 10 also includes first to third dog rings 28a to 28c fitted so as to be non-rotatable relative to the output shaft 22 and relatively movable with respect to the output shaft 22 in the axial direction of the output shaft 22. The first to third dog rings 28a to 28c are examples of the dog ring according to the present disclosure.

The first dog ring 28a is disposed adjacent to an input gear 30a, to be discussed later, of the input gear pair 26a in the axial direction of the output shaft 22. The first dog ring 28a is also disposed adjacent to a second speed gear 30b, to be discussed later, of the second speed gear pair 26b in the axial direction of the output shaft 22. The first dog ring 28a is an interruption mechanism that is switchable between a state in which the input gear 30a or the second speed gear 30b and the output shaft 22 are connected so that one of the gears 30a and 30b and the output shaft 22 rotate together with each other and a state in which the input gear 30a and the second speed gear 30b and the output shaft 22 are disconnected so that such components rotate relative to each other.

The second dog ring 28b is disposed adjacent to a third speed gear 30c, to be discussed later, of the third speed gear pair 26c in the axial direction of the output shaft 22. The second dog ring 28b is also disposed adjacent to a sixth speed gear 30d, to be discussed later, of the sixth speed gear pair 26d in the axial direction of the output shaft 22. The second dog ring 28b is an interruption mechanism that is switchable between a state in which the third speed gear 30c or the sixth speed gear 30d and the output shaft 22 are connected so that one of the gears 30c and 30d and the output shaft 22 rotate together with each other and a state in which the third speed gear 30c and the sixth speed gear 30d and the output shaft 22 are disconnected so that such components rotate relative to each other.

The third dog ring 28c is disposed adjacent to a fourth speed gear 30e, to be discussed later, of the fourth speed gear pair 26e in the axial direction of the output shaft 22. The third dog ring 28c is also disposed adjacent to a first speed gear 30f, to be discussed later, of the first speed gear pair 26f in the axial direction of the output shaft 22. The third dog ring 28c is an interruption mechanism that is switchable between a state in which the fourth speed gear 30e or the first speed gear 30f and the output shaft 22 are connected so that one of the gears 30e and 30f and the output shaft 22 rotate together with each other and a state in which the fourth speed gear 30e and the first speed gear 30f and the output shaft 22 are disconnected so that such components rotate relative to each other (hereinafter, the first to third dog rings 28a to 28c will be referred to as "dog rings 28" if not differentiated from each other).

The input gear pair 26a is constituted from the input gear 30a and a counter gear 32a meshed with the input gear 30a. The input gear 30a is connected to the input shaft 18. Power of the engine 12 is transferred to the input gear 30a via the clutch 16. The counter gear 32a is provided so as to be non-rotatable relative to the counter shall 20 which rotates about a rotational axis CL2. Thus, when the input gear 30a is rotated, rotation is transferred to the counter gear 32a to rotate the counter shaft 20, When the input gear 30a and the output shaft 22 are connected to each other by the first dog ring 28a, the input shaft 18 and the output shaft 22 are directly coupled to each other. At this time, a fifth gear stage 5th with a speed ratio γ of 1.0 is established in the transmission 10. A surface of the input gear 30a that faces the first dog ring 28a is provided with gear-side meshing teeth 35a that can be meshed with meshing teeth 58 and 68, to be discussed later, of the first dog ring 28a. The gear-side meshing teeth 35a and the first dog ring 28a constitute a first dog clutch 38a (dog clutch). The input gear 30a is an example of the shifting gear according to the present disclosure.

The second speed gear pair 26b is constituted from the second speed gear 30b and a second speed counter gear 32b meshed with the second speed gear Sob. The second speed gear Sob is fitted with the outer peripheral side of the output shaft 22 so as to be relatively rotatable. The second speed counter gear 32b is provided so as to be non-rotatable relative to the counter shaft 20. When the second speed gear 30b and the output shaft 22 are connected to each other by the first dog ring 28a such that power can be transferred therebetween, the input shaft 18 and the output shaft 22 are connected to each other via the second speed gear pair 26b such that power can be transferred therebetween. At this time, a second gear stage 2nd is established in the transmission 10. A surface of the second speed gear 30b that faces the first dog ring 28a is provided with gear-side meshing teeth 35b that can be meshed with meshing teeth 60 and 64, to be discussed later, of the first dog ring 28a. The gear-side meshing teeth 35b and the first dog ring 28a constitute a second dog clutch 38b (dog clutch). The second speed gear 30b is an example of the shifting gear according to the present disclosure.

The third speed gear pair 26c is constituted from the third speed gear 30c and a third speed counter gear 32c meshed with the third speed gear 30c. The third speed gear 30c is fitted with the outer peripheral surface of the output shaft 22 so as to be relatively rotatable. The third speed counter gear 32c is provided so as to be non-rotatable relative to the counter shaft 20. When the third speed gear 30c and the output shaft 22 are connected to each other by the second dog ring 28b such that power can be transferred therebetween, the input shaft 18 and the output shaft 22 are connected to each other via the third speed gear pair 26c such that power can be transferred therebetween. At this time, a third gear stage 3rd is established in the transmission 10. A surface of the third speed gear 30c that faces the second dog ring 28b is provided with gear-side meshing teeth 35c that can be meshed with meshing teeth 58 and 68, to be discussed later, of the second dog ring 28b. The gear-side meshing teeth 35c and the second dog ring 28b constitute a third dog clutch 38c (dog clutch). The third speed gear 30c is an example of the shifting gear according to the present disclosure.

The sixth speed gear pair 26d is constituted from the sixth speed gear 30d and a sixth speed counter gear 32d meshed With the sixth speed gear 30d The sixth speed gear 30d is fitted with the outer peripheral surface of the output shaft 22 so as to be relatively rotatable. The sixth speed counter gear 32d is provided so as to be ion-rotatable relative to the counter shalt 20. When the sixth speed gear 30d and the output shaft 22 are connected to each other by the second dog ring 28b such that power can be transferred therebetween, the input shall 18 and the output shaft 22 are connected to each other via the sixth speed gear pair 26d such that power can be transferred therebetween. At this time, a sixth gear stage 6th with a minimum speed ratio γ is established in the transmission 10. A surface of the sixth speed gear 30d that faces the second dog ring 28b is provided with gear-side meshing teeth 35d that can be meshed with meshing teeth 60 and 64, to be discussed later, of the second dog ring 28b. The gear-side meshing teeth 35d and the second dog ring 28b constitute a fourth dog clutch 38d (dog clutch). The sixth speed gear 30d is an example of the shifting gear according to the present disclosure.

The fourth speed gear pair 26e is constituted from the fourth speed gear 30e and a fourth speed counter gear 32e meshed with the fourth speed gear 30e. The fourth speed gear 30e is fitted with the outer peripheral surface of the output shaft 22 so as to be relatively rotatable. The fourth speed counter gear 32e is provided so as to be non-rotatable relative to the counter shaft 20. When the fourth speed gear 30e and the output shaft 22 are connected to each other by the third dog ring 28c such that power can be transferred therebetween, the input shaft 18 and the output shaft 22 are connected to each other via the fourth speed gear pair 26e such that power can be transferred therebetween. At this time; a fourth gear stage 4th is established in the transmission 10. A surface of the fourth speed gear 30e that faces the third dog ring 28c is provided with gear-side meshing teeth 35e that can be meshed with meshing teeth 58 and 68, to be discussed later, of the third dog ring 28c. The gear-side meshing teeth 35e and the third dog ring 28c constitute a fifth dog clutch 38e (dog clutch). The fourth speed gear 30e is an example of the shilling gear according to the present disclosure.

The first speed gear pair 26f is constituted from the first speed gear 30f and a first speed counter gear 32f meshed with the first speed gear 30f. The first speed gear 30f is fitted with the outer peripheral surface of the output shaft 22 so as to be relatively rotatable. The first speed counter gear 32f is provided so as to be non-rotatable relative to the counter shaft 20, When the first speed gear 30f and the output shaft 22 are connected to each other by the third dog ring 28c such that power can be transferred therebetween, the input shaft 18 and the output shaft 22 are connected to each other via the first speed gear pair 26f such that power can be transferred therebetween. At this time, a first gear stage 1st with a maximum speed ratio γ is established in the transmission 10. A surface of the first speed gear 30f that faces the third dog ring 28c is provided with gear-side meshing teeth 35f that can be meshed with meshing teeth 60 and 64, to be discussed later, of the third dog ring 28c (hereinafter, the gear-side meshing teeth 35a to 35f will be referred to as "gear-side meshing teeth 35" if not differentiated from each other). The gear-side meshing teeth 35f and the third dog ring 28c constitute a sixth dog clutch 38f (dog clutch). The first speed gear 30f is an example of the shifting gear according to the present disclosure.

In this manner, the transmission 10 is configured to switchably establish six forward gear stages by switching the respective actuation states of the first to third dog rings 28a to 28c. The respective actuation states of the dog rings 28 are switched by moving the dog rings 28 in the axial direction of the output shaft 22. The dog rings 28 are moved in the axial direction of the output shaft 22 by a shift mechanism 33.

The shift mechanism 33 is configured to include shift forks 36a to 36c fitted with the dog rings 28a to 28c, respectively, a barrel 40 provided with shift grooves 42a to 42c that prescribe the positions of the shift forks 36a to 36c which are fitted with the dog rings 28a to 28c, respectively, and a shift actuator 41 that rotates the barrel 40. The barrel 40 is disposed in parallel with the output shaft 22.

The shift fork 36a is fitted with an annular groove 34a provided in the outer peripheral portion of the first dog ring 28a. The shift fork 36a is further engaged with the shift groove 42a of the barrel 40. The shift fork 36b is fitted with an annular groove 34b provided in the outer peripheral portion of the second dog ring 28b. The shift fork 36b is further engaged with the shift groove 42b of the barrel 40. The shift fork 36c is fitted with an annular groove 34c provided in the outer peripheral portion of the third dog ring 28c. The shift fork 36c is further engaged with the shift groove 42c of the barrel 40.

The shift grooves 42a to 42c are provided along the circumferential direction of the barrel 40, and shaped such that a part of the shift grooves 42a to 42c in the circumferential direction is bent in the axial direction of the barrel 40. Thus, when the barrel 40 is rotated, the shift forks 36a to 36c are moved in the axial direction of the barrel 40 along the shape of the shift grooves 42a to 42c. When the shift forks 36a to 36c are moved in the axial direction of the barrel 40, the dog rings 28a to 28c which are fitted with the shift forks 36a to 36c are moved in the axial direction of the output shaft 22.

The shift grooves 42a to 42c are provided such that upshifts are performed sequentially in the order from the first gear stage 1st to the sixth gear stage 6th when the barrel 40 is rotated in one direction, and such that downshifts are performed sequentially in the order from the sixth gear stage 6th to the first gear stage 1st when the barrel 40 is rotated in the other direction. That is, the shift grooves 42a to 42c are shaped such that the shift forks 36a to 36c (and the first to third dog rings 28a to 28c) which are engaged with the shift grooves 42a to 42c are moved to positions at which upshifts are performed in the order from the first gear stage 1st to the sixth gear stage 6th when the barrel 40 is rotated in one direction, and such that the shift forks 36a to 36c (and the first to third dog rings 28a to 28c) are moved to positions at which downshifts are performed in the order from the sixth gear stage 6th to the first gear stage 1st when the barrel 40 is rotated in the other direction.

The shift actuator 41 includes a pinion 44 provided on the barrel 40, a rack 46 provided with teeth meshed with the pinion 44, and an electric actuator 48 that functions as a drive force source that moves the rack 46. The electric actuator 48 is driven in accordance with a drive signal output from an electronic control device (not illustrated). When the rack 46 is moved in the upshift direction by the electric actuator 48, the barrel 40 is rotated in the upshift direction via the pinion 44. When the rack 46 is moved in the downshift direction by the electric actuator 48, meanwhile, the barrel 40 is rotated in the downshift direction via the pinion 44.

With the shift mechanism 33 configured as described above, upshifts are performed in the transmission 10 by moving the shift forks 36a to 36c and the dog rings 28a to 28c in the upshift direction by the shift actuator 41 rotating the barrel 40 in the upshift direction. Meanwhile, downshifts are performed in the transmission 10 by moving the shift forks 36a to 36c and the dog rings 28a to 28c in the downshift direction by the shift actuator 41 rotating the barrel 40 in the downshift direction.

Figure 2:
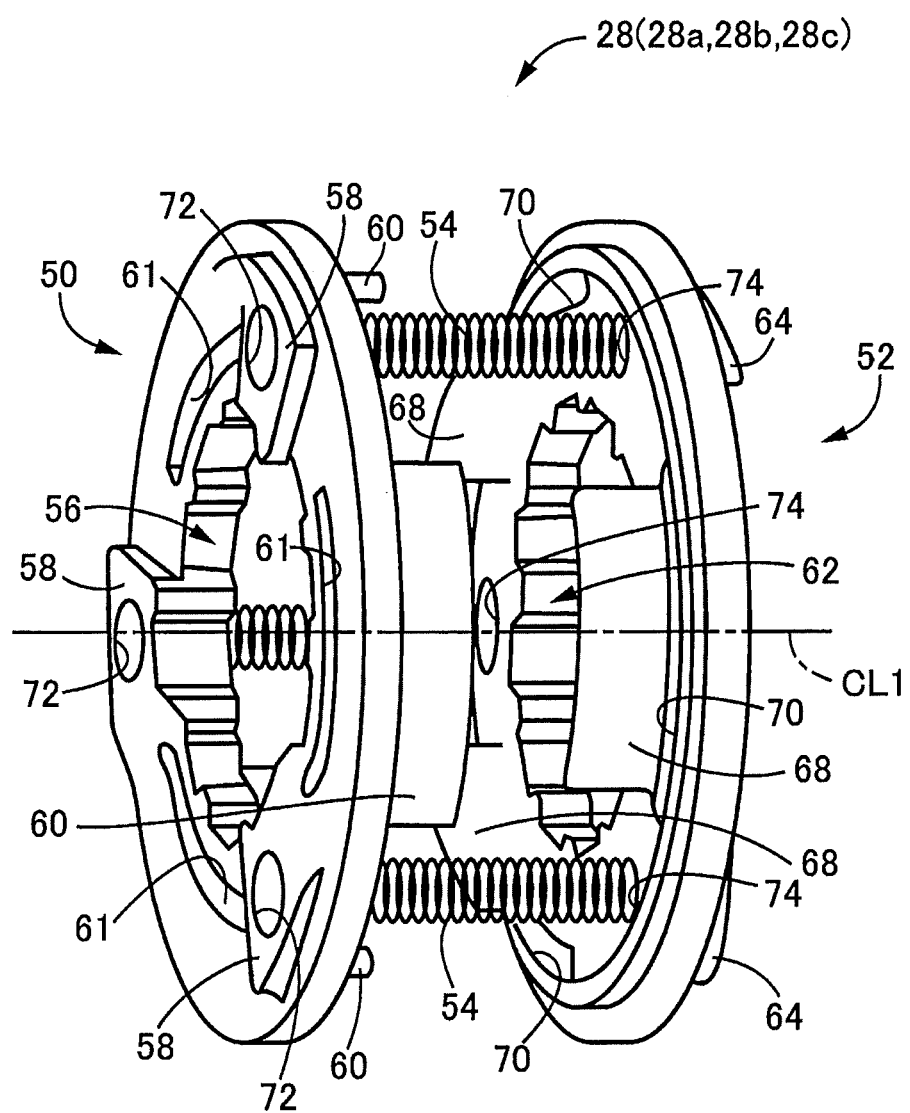
FIG. 2 is an exploded view illustrating the structure of a dog ring in FIG. 1.

Next, the structure of the first to third dog rings 28a to 28c will be described. FIG. 2 illustrates the structure of the dog ring 28. The first to third dog rings 28a to 28c are basically the same in structure. Therefore, the dog ring 28 corresponding to the dog rings 28a to 28c is illustrated in FIG. 2. The dog ring 28 in FIG. 2 is configured to be rotatable about the rotational axis CL1. In FIG. 2, the counterclockwise direction about the rotational axis CL1 corresponds to the forward rotational direction, and the clockwise direction corresponds to the rearward rotational direction.

The dog ring 28 is configured to include a first ring 50, a second ring 52, and three springs 54 interposed between the first ring 50 and the second ring 52. The three springs 54 are disposed at equal intervals over the circumference of the first ring 50 and the second ring 52 to couple the first ring 50 and the second ring 52 to each other, and stably bias the first ring 50 and the second ring 52 in the direction of drawing each other. When the shifting gear 30 which is adjacent to the first ring 50 serves as the shifting gear according to the present disclosure, the first ring 50 is an example of the first ring according to the present disclosure, and the second ring 52 is an example of the second ring according to the present disclosure. In the case where the shifting gear 30 which is adjacent to the second ring 52 serves as the shifting gear according to the present disclosure, on the other hand, the first ring 50 is an example of the second ring according to the present disclosure, and the second ring 52 is an example of the first ring according to the present disclosure.

The first ring 50 is formed in a ring shape, and disposed adjacent to the predetermined shifting gear 30 in the axial direction of the output shaft 22 (hereinafter, the direction of the rotational axis CL1). For example, the first ring 50 of the first dog ring 28a is disposed adjacent to the input gear 30a. The inner peripheral portion of the first ring 50 is provided with inner peripheral spline teeth 56 to be spline-fitted with a sleeve (not illustrated) fixed to the output shaft 22. Consequently, the first ring 50 is relatively non-rotatable and relatively movable in the axial direction of the output shaft 22 with respect to the output shaft 22 via the sleeve in an assembled state.

A surface of the first ring 50 on the side (left side on the drawing sheet surface) facing the shifting gear 30 which is adjacent in the direction of the rotational axis CL1 is provided with three first meshing teeth 58 that project toward the shifting gear 30 (left side on the drawing sheet surface) in the direction of the rotational axis CL1. The first meshing teeth 58 are provided at equal angular intervals in the circumferential direction of the first ring 50 (about the rotational axis CL1). The first meshing teeth 58 are positioned and shaped so as to be meshed with the gear-side meshing teeth 35 of the shifting gear 30, which is adjacent in the direction of the rotational axis CL1, when the first ring 50 is moved toward the shifting gear 30.

A surface of the first ring 50 on the side (right side on the drawing sheet surface) facing the second ring 52 in the direction of the rotational axis CL1 is provided with three second meshing teeth 60 that project toward the shifting gear 30 (right side on the drawing sheet surface), which is adjacent to the second ring 52, in the direction of the rotational axis CL1. The second meshing teeth 60 are provided at equal angular intervals in the circumferential direction of the first ring 50. The second meshing teeth 60 are provided in an arcuate shape along the circumferential direction of the first ring 50 when the second meshing teeth 60 are seen in the direction of the rotational axis CL1. The second meshing teeth 60 project from the second ring 52 toward the shifting gear 30 while penetrating through holes 70, to be discussed later, of the second ring 52 when the first ring 50 and the second ring 52 are in the assembled state, specifically when respective surfaces of the first ring 50 and the second ring 52 that face each other are in contact with each other. The second meshing teeth 60 are positioned and shaped so as to be meshed with the gear-side meshing teeth 35 of the shifting gear 30, which is adjacent to the second ring 52 in the direction of the rotational axis CL1, when the first ring 50 is moved toward the shifting gear 30.

The first ring 50 is provided with through holes 61 that penetrate the first ring 50 in the direction of the rotational axis CL1. The through holes 61 are positioned and shaped so as to be penetrated by fourth meshing teeth 68, to be discussed later, of the second ring 52 when the first ring 50 and the second ring 52 are in the assembled state. Since the fourth meshing teeth 68 are formed in an arcuate shape as discussed later, the through holes 61 are also formed in an arcuate shape along the circumferential direction of the first ring 50.

The second ring 52 is formed in a ring shape, and disposed adjacent to the predetermined shifting gear 30 in the direction of the rotational axis CL1. For example, the second ring 52 of the first dog ring 28a is disposed adjacent to the second speed gear 30b. The second ring 52 is also disposed with the first ring 50 interposed between the second ring 52 and the predetermined shifting gear 30 which is adjacent to the first ring 50 in the direction of the rotational axis CL1. For example, the second ring 52 of the first dog ring 28a is disposed with the first ring 50 interposed between the second ring 52 and the input gear 30a which is adjacent to the first ring 50.

The inner peripheral surface of the second ring 52 is provided with inner peripheral spline teeth 62 to be spline-fitted with the sleeve (not illustrated). Consequently, the second ring 52 is relatively non-rotatable and relatively movable in the axial direction of the output shaft 22 with respect to the output shaft 22 via the sleeve in the assembled state.

A surface of the second ring 52 on the side (right side on the drawing sheet surface) facing the shifting gear 30 which is adjacent in the direction of the rotational axis CL1 is provided with three third meshing teeth 64 that project toward the shifting gear 30 (right side on the drawing sheet surface) in the direction of the rotational axis CL1. The third meshing teeth 64 are provided at equal angular intervals in the circumferential direction of the second ring 52 (about the rotational axis CL1). The third meshing teeth 64 are positioned and shaped so as to be meshed with the gear-side meshing teeth 35 of the shifting gear 30, which is adjacent in the direction of the rotational axis CL1, when the second ring 52 is moved toward the shifting gear 30. The third meshing teeth 64 are an example of the first meshing teeth according to the present disclosure.

A surface of the second ring 52 on the side (left side on the drawing sheet surface) facing the first ring 50 in the direction of the rotational axis CL1 is provided with three fourth meshing teeth 68 that project toward the shifting gear 30 (left side on the drawing sheet surface), which is adjacent to the first ring 50, in the direction of the rotational axis CL1. The fourth meshing teeth 68 are provided at equal angular intervals in the circumferential direction of the second ring 52. The fourth meshing teeth 68 are formed in an arcuate shape along the circumferential direction of the second ring 52 when the fourth meshing teeth 68 are seen in the direction of the rotational axis CL1. The fourth meshing teeth 68 project from the first ring 50 toward the shifting gear 30 while penetrating the through holes 61 of the first ring 50 when the first ring 50 and the second ring 52 are in the assembled state. The fourth meshing teeth 68 are positioned and shaped so as to be meshed with the gear-side meshing teeth 35 of the shifting gear 30, which is adjacent to the first ring 50 in the direction of the rotational axis CL1, when the second ring 52 is moved toward the shifting gear 30. The fourth meshing teeth 68 are an example of the second meshing teeth according to the present disclosure.

The second ring 52 is provided with a plurality of through holes 70 that penetrate the second ring 52 in the direction of the rotational axis CL1. The through holes 70 are positioned and shaped so as to be penetrated by the second meshing teeth 60 of the first ring 50 when the first ring 50 and the second ring 52 are in the assembled state. Since the second meshing teeth 60 are formed in an arcuate shape, the through holes 70 are also formed in an arcuate shape along the circumferential direction of the second ring 52.

The first meshing teeth 58 and the third meshing teeth 64 are provided at the same position in the circumferential direction when the first ring 50 and the second ring 52 are in the assembled state. Likewise, the second meshing teeth 60 and the fourth meshing teeth 68 are also provided at the same position in the circumferential direction when the first ring 50 and the second ring 52 are in the assembled state. The second meshing teeth 60 and the fourth meshing teeth 68 are provided at positions shifted in the radial direction so as not to interfere with each other when the first ring 50 and the second ring 52 are in the assembled state. Specifically, the second meshing teeth 60 are provided on the outer side in the radial direction with respect to the fourth meshing teeth 68.

The first meshing teeth 58 and the fourth meshing teeth 68 are provided so as to be arranged in the circumferential direction (rotational direction) of the dog ring 28 when the first ring 50 and the second ring 52 are in the assembled state. Specifically, the first meshing teeth 58 and the fourth meshing teeth 68 are provided so as to be arranged in the order of the fourth meshing teeth 68 and the first meshing teeth 58 in the forward rotational direction (counterclockwise direction in FIG. 2) of the dog ring 28. Meanwhile, the second meshing teeth 60 and the third meshing teeth 64 are provided so as to be arranged in the circumferential direction of the dog ring 28 when the first ring 50 and the second ring 52 are in the assembled state. Specifically, the second meshing teeth 60 and the third meshing teeth 64 are provided so as to be arranged in the order of the second meshing teeth 60 and the third meshing teeth 64 in the forward rotational direction (counterclockwise direction in FIG. 2) of the dog ring 28.

The three springs 54 are interposed between the first ring 50 and the second ring 52. The springs 54 couple the first ring 50 and the second ring 52 to each other, and bias the first ring 50 and the second ring 52 in the direction of drawing each other. Thus, when an external force is not applied to the first dog ring 28, the first ring 50 and the second ring 52 are in the assembled state in which respective surfaces of the first ring 50 and the second ring 52 that face each other are in contact with each other by the biasing force of the springs 54. The structure in which the first ring 50 and the second ring 52 are coupled to each other by the springs 54 is known in the art, and therefore is not described.

The springs 54 are provided inside a portion of the first ring 50 at which the first meshing teeth 58 are provided and inside a portion of the second ring 52 at which the third meshing teeth 64 are provided. The first meshing teeth 58 of the first ring 50 are provided with first housing holes 72 that house the springs 54. The third meshing teeth 64 of the second ring 52 are provided with second housing holes 74 that house the springs 54. The first housing holes 72 and the second housing holes 74 have the same hole diameter. The first housing holes 72 of the first ring 50 and the second housing holes 74 of the second ring 52 are provided so as to overlap each other when the first housing holes 72 and the second housing holes 74 are seen in the direction of the rotational axis CL1 when the first ring 50 and the second ring 52 are in the assembled state. That is, the first housing holes 72 of the first ring 50 and the second housing holes 74 of the second ring 52 are provided at the same position when the first ring 50 and the second ring 52 are in the assembled state. The springs 54 are provided in spaces provided by the first housing holes 72 and the second housing holes 74 when the first ring 50 and the second ring 52 are in the assembled state.

In this manner, the springs 54 are provided in the first housing holes 72 of the first meshing teeth 58 and the second housing holes 74 of the third meshing teeth 64 when the first ring 50 and the second ring 52 are in the assembled state. Thus, the springs 54 are provided on the same circumference as the first meshing teeth 58 in the circumferential direction of the first ring 50, and provided on the same circumference as the third meshing teeth 64 in the circumferential direction of the second ring 52. In other words, the springs 54 are provided so as to overlap the first meshing teeth 58 and the third meshing teeth 64 as seen in the circumferential direction, and provided at the same position as the first meshing teeth 58 and the third meshing teeth 64 in the radial direction about the rotational axis CL1.

The second meshing teeth 60 are provided on the same circumference as the third meshing teeth 64 in the circumferential direction of the second ring 52, and the fourth meshing teeth 68 are provided on the same circumference as the first meshing teeth 58 in the circumferential direction of the first ring 50, when the first ring 50 and the second ring 52 are in the assembled state. Thus, the springs 54 are also provided on the same circumference as the second meshing teeth 60 and the fourth meshing teeth 68. In other words, the springs 54 are provided so as to overlap the second meshing teeth 60 and the fourth meshing teeth 68 as seen in the circumferential direction, and provided at the same position as the second meshing teeth 60 and the fourth meshing teeth 68 in the radial direction about the rotational axis CL1.

Consequently, the springs 54 are not provided on the outer peripheral side with respect to the meshing teeth 58, 60, 64, and 68, and therefore there is no need to increase the dimension of the dog ring 28 in the radial direction by an amount corresponding to the springs 54 being provided on the outer peripheral side with respect to the meshing teeth 58, 60, 64, and 68. As a result, the outside diameter of the dog ring 28 is reduced, which can reduce the weight and the cost of the dog ring 28.

Figure 3:
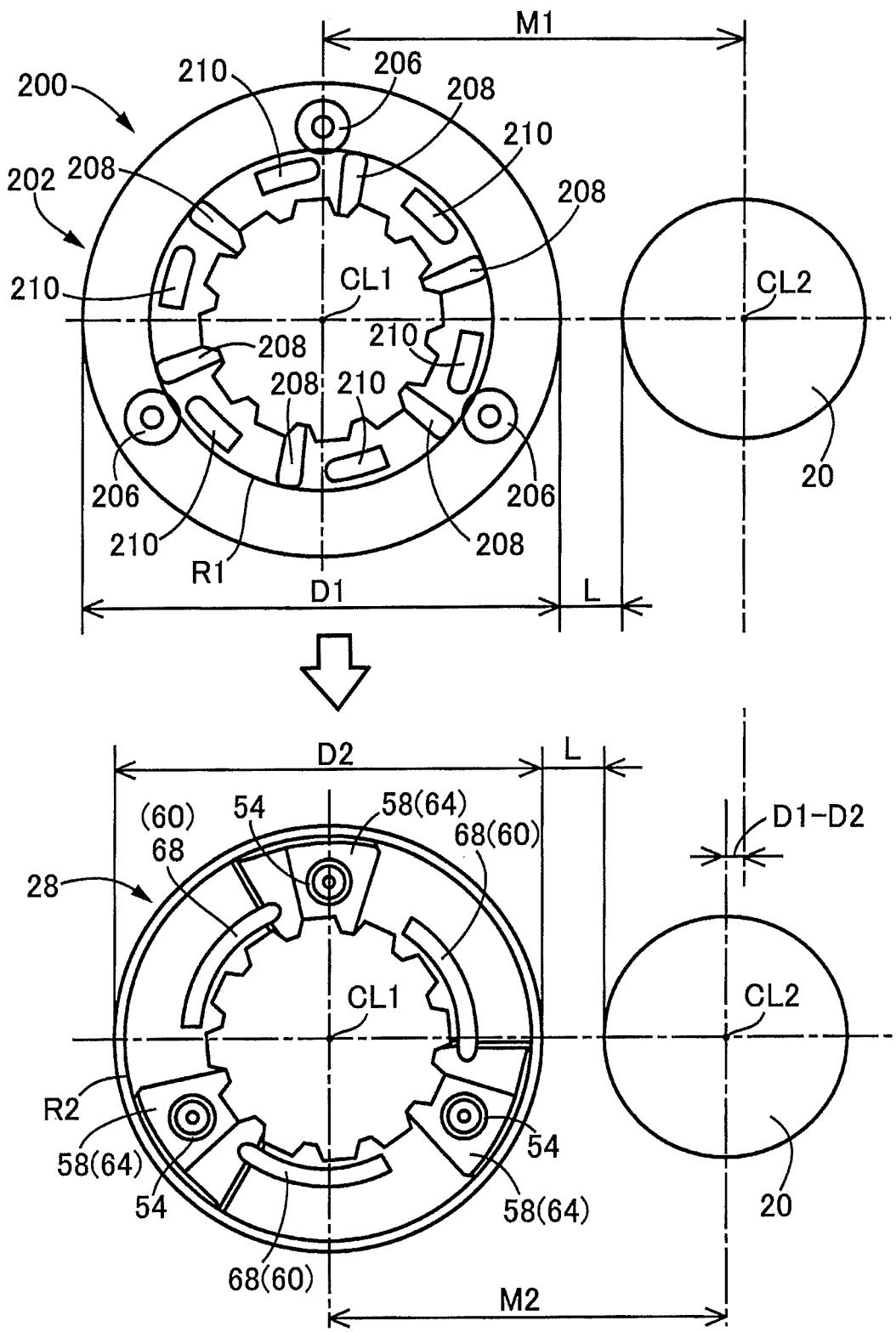
FIG. 3 is a comparative view which illustrates a dog ring according to the related art and the dog ring in FIG. 2.

FIG. 3 is a comparative view which illustrates a dog ring 200 according to the related art and the dog ring 28 according to the first embodiment. FIG. 3 illustrates the dog ring 200 according to the related art and the dog ring 28, respectively, as seen in the direction of the rotational axis CL1.

The dog ring 200 according to the related art in the upper side in FIG. 3 will be described briefly. The dog ring 200 is configured to include a first ring 202, a second ring (not illustrated in FIG. 3 since the second ring is positioned on the back side of the drawing sheet surface), and springs 206 interposed between the first ring 202 and the second ring. FIG. 3 illustrates a plurality of first meshing teeth 208 provided on the first ring 202 and fourth meshing teeth 210 provided on the second ring to penetrate through holes provided in the first ring 202.

In the dog ring 200, as illustrated in FIG. 3, the springs 206 are provided on the outer side in the radial direction about the rotational axis CL1 with respect to the first meshing teeth 208 and the fourth meshing teeth 210. That is, the springs 206 are provided on the outer peripheral side with respect to a circle R1 that is centered on the rotational axis CL1 and that circumscribes a portion of the meshing teeth 208 and 210 of the dog ring 200 positioned on the outermost peripheral side. The outside diameter of the dog ring 200 is increased by an amount corresponding to the springs 206 being provided on the outer peripheral side with respect to the circle R1.

In the dog ring 28 according to the first embodiment, on the other hand, the springs 54 are provided at the same position as the meshing teeth 58, 60, 64, and 68 of the dog ring 28 in the radial direction about the rotational axis CL1. The springs 54 are provided on the inner peripheral side with respect to a circle R2 that is centered on the rotational axis CL1 and that circumscribes a portion of the meshing teeth 58, 60, 64, and 68 positioned on the outermost peripheral side. Consequently, the springs 54 are provided on the inner peripheral side compared to the springs 206 of the dog ring 200 according to the related art, and therefore an outside diameter D2 of the dog ring 28 is smaller than an outside diameter D1 of the dog ring 200. Thus, the dog ring 28 is smaller in size than the dog ring 200, which can reduce the weight and the cost of the dog ring 28.

The circles illustrated on the right side on the drawing sheet surface of the dog ring 200 and the dog ring 28 in FIG. 3 correspond to the counter shaft 20 which is disposed in parallel with the output shaft 22. A clearance L which is necessary in terms of design is provided between the dog ring 200 and the counter shaft 20, and the same clearance L is provided also between the dog ring 28 and the counter shaft 20. Since the outside diameter D2 of the dog ring 28 is smaller than the outside diameter D1 of the dog ring 200, an inter-axis distance M2 for the dog ring 28 between the rotational axis CL1 of the output shaft 22 and the rotational axis CL2 of the counter shaft 20 is accordingly shorter than an inter-axis distance M1 for the dog ring 200 by the difference (D1−D2) in the outside diameter. Consequently, the size of the transmission 10 can also be reduced, which can reduce the weight and the cost of the transmission 10.

Figure 4A:
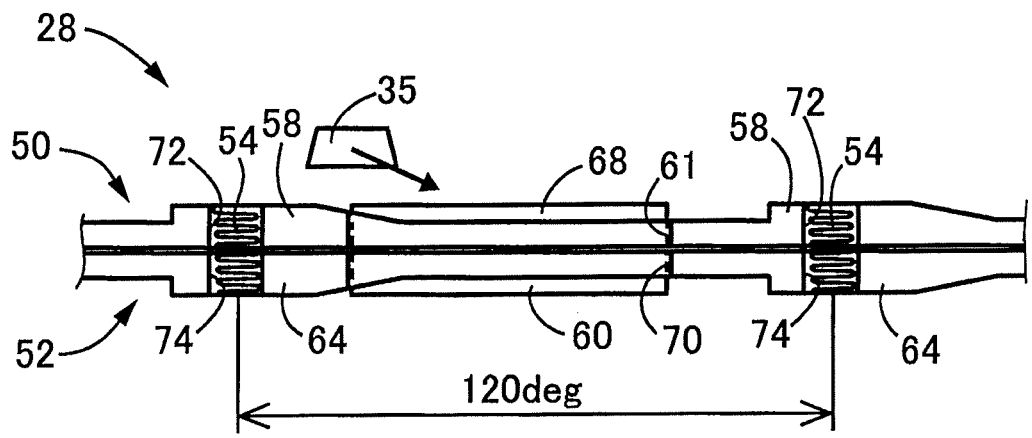
FIG. 4A is a development view in which a part of the dog ring in FIG. 2 in the circumferential direction is developed in plan, chronologically illustrating a state in a transient period in which gear-side meshing teeth are meshed with first meshing teeth of a first dog ring with an engine in a driving state.
Figure 4B:
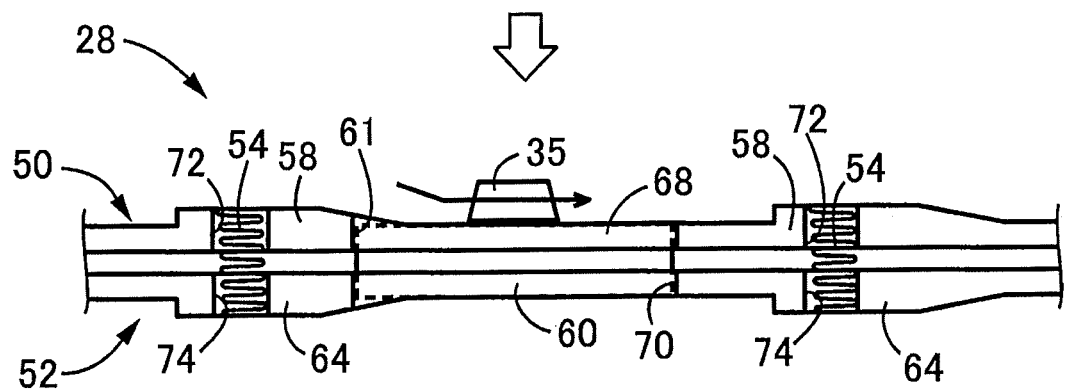
FIG. 4B is a development view in which a part of the dog ring in FIG. 2 in the circumferential direction is developed in plan, chronologically illustrating a state in the transient period in which the gear-side meshing teeth are meshed with the first meshing teeth of the first dog ring with the engine in the driving state.
Figure 4C:
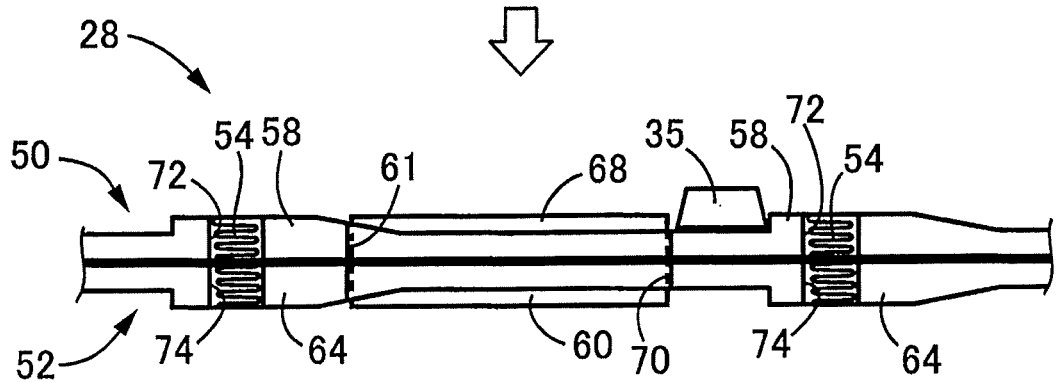
FIG. 4C is a development view in which a part of the dog ring in FIG. 2 in the circumferential direction is developed in plan, chronologically illustrating a state in the transient period in which the gear-side meshing teeth are meshed with the first meshing teeth of the first dog ring with the engine in the driving state.

Next, operation of the dog ring 28 configured as described above will be described. FIGS. 4A to 4C chronologically illustrate a state in a transient period in which the gear-side meshing teeth 35 of the shifting gear 30 are meshed with the first meshing teeth 58 of the dog ring 28 with the engine 12 in a drive state. FIGS. 4A to 4C are each a view in which a part of the dog ring 28 in the circumferential direction is developed in plan. The right side of the drawing sheet surface corresponds to the forward rotational direction. The left side of the drawing sheet surface corresponds to the rearward rotational direction.

In the initial state in which meshing is started illustrated in FIG. 4A, the gear-side meshing teeth 35 are moved toward the dog ring 28. While the gear-side meshing teeth 35 are illustrated as being moved in FIGS. 4A to 4C, the dog ring 28 is moved toward the gear-side meshing teeth 35 in reality. That is, movement of the gear-side meshing teeth 35 in FIGS. 4A to 4C indicates movement thereof relative to the dog ring 28. With the engine 12 in the drive state, the rotational speed of the gear-side meshing teeth 35 is higher than the rotational speed of the dog ring 28. Consequently, the gear-side meshing teeth 35 relatively move toward the right side on the drawing sheet surface (side of forward rotation) with respect to the dog ring 28.

FIG. 4B illustrates a state in which the gear-side meshing teeth 35 abut against the fourth meshing teeth 68 of the second ring 52 with the gear-side meshing teeth 35 moved toward the dog ring 28 and further the first ring 50 and the second ring 52 are separated from each other with the gear-side meshing teeth 35 pushed against the fourth meshing teeth 68. As illustrated in FIG. 4B, the first ring 50 and the second ring 52 are separated from each other with the springs 54 elastically deformed with the gear-side meshing teeth 35 pushed against the fourth meshing teeth 68. In this state, the gear-side meshing teeth 35 are moved toward the right side on the drawing sheet surface.

FIG. 4C illustrates a state in which the gear-side meshing teeth 35 are meshed with the first meshing teeth 58 with the gear-side meshing teeth 35 relatively moved toward the right side on the drawing sheet surface with respect to the dog ring 28 from the state in FIG. 4B. At this time, abutment between the gear-side meshing teeth 35 and the fourth meshing teeth 68 is canceled. Therefore, the second ring 52 is moved toward the first ring 50 by the elastic restoring force of the springs 54, and a state (assembled state) in which the first ring 50 and the second ring 52 abut against each other is restored. Consequently, the gear-side meshing teeth 35 and the first meshing teeth 58 are meshed with each other, which enables power transfer between the gear-side meshing teeth 35 and the first meshing teeth 58. The clearance between the first meshing teeth 58 and the fourth meshing teeth 68 for accommodating the gear-side meshing teeth 35 illustrated in FIG. 4C is set to a value obtained by adding an allowance set in advance to the width of the gear-side meshing teeth 35.

With the first embodiment, as discussed above, the springs 54 which are interposed between the first ring 50 and the second ring 52 are provided on the inner peripheral side with respect to the circle R2 which is centered on the rotational axis CL1 and which circumscribes a portion of the meshing teeth 58, 60, 64, and 68 of the first ring 50 and the second ring 52 positioned on the outermost peripheral side. Therefore, the springs 54 are not positioned on the outer peripheral side with respect to the meshing teeth 58, 60, 64, and 68, and the outside diameter of the dog ring 28 can be reduced accordingly. Hence, the weight and the cost of the dog ring 28 can be reduced.

With the first embodiment, the springs 54 are provided inside the first meshing teeth 58 and the third meshing teeth 64. Therefore, the springs 54 are not positioned on the outer peripheral side with respect to the first meshing teeth 58 and the third meshing teeth 64, and the outside diameter of the dog ring 28 can be reduced accordingly. Hence, the weight and the cost of the dog ring 28 can be reduced.

Next, a second embodiment of the present disclosure will be described.

In the following description, portions that are the same as those of the first embodiment discussed earlier are given the same reference numerals to omit description.

Figure 5:
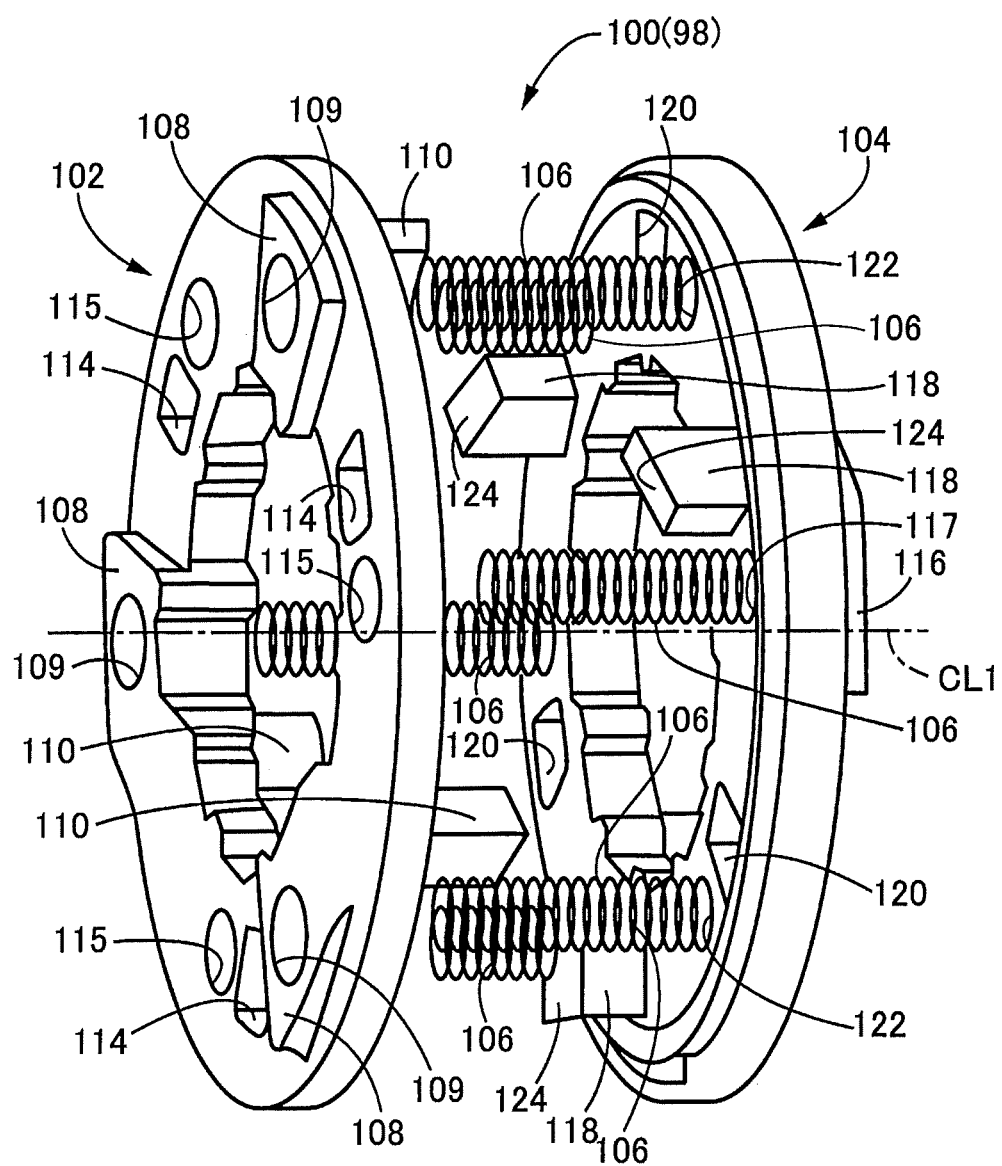
FIG. 5 is an exploded view illustrating the structure of a dog ring according to a second embodiment of the present disclosure.

FIG. 5 illustrates the structure of a dog ring 100 that constitutes a dog clutch 98 according to a second embodiment of the present disclosure. The dog ring 100 is configured to include a first ring 102, a second ring 104, and six springs 106 interposed between the first ring 102 and the second ring 104. The six springs 106 are disposed at equal intervals over the circumference of the first ring 102 and the second ring 104 to couple the first ring 102 and the second ring 104 to each other, and stably bias the first ring 102 and the second ring 104 in the direction of drawing each other.

The first ring 102 is formed in a ring shape, and relatively non-rotatable and relatively movable in the axial direction of the output shaft 22 (not illustrated in FIG. 5), which is disposed on the inner peripheral side of the first ring 102, with respect to the output shaft 22.

A surface of the first ring 102 on the side (left side on the drawing sheet surface) of the shifting gear 30 which is adjacent in the direction of the rotational axis CL1 is provided with three first meshing teeth 108 that project toward the shifting gear 30. The first meshing teeth 108 are provided at equal angular intervals in the circumferential direction of the first ring 102. The first meshing teeth 108 are provided with first housing holes 109 that house the springs 106.

A surface of the first ring 102 that faces the second ring 104 in the direction of the rotational axis CL1 is provided with three second meshing teeth 110 that project toward the second ring 104. The second meshing teeth 110 are provided at equal angular intervals in the circumferential direction of the first ring 102. The second meshing teeth 110 are provided so as to project from the second ring 104 while penetrating through holes 120, to be discussed later, provided in the second ring 104 when the first ring 102 and the second ring 104 are in the assembled state. An inclined surface 112 (see FIGS. 6A to 6D) is provided on the second meshing teeth 110 toward the rearward rotational direction (the clockwise direction about the rotational axis CL1). The inclined surface 112 is inclined in the direction of approaching the first ring 102 toward the rearward rotational direction (see FIGS. 6A to 6D).

The first ring 102 is provided with three through holes 114 that penetrate the first ring 102 in the direction of the rotational axis CL1. The through holes 114 are positioned and shaped so as to be penetrated by fourth meshing teeth 118, to be discussed later, of the second ring 104 when the first ring 102 and the second ring 104 are in the assembled state. Three second housing holes 115 that house the springs 106 are provided adjacent to the through holes 114 in the circumferential direction of the first ring 102. In FIG. 5, the counterclockwise direction about the rotational axis CL1 corresponds to the vehicle forward rotational direction, and therefore the second housing holes 115 are provided on the side in the rearward rotational direction with respect to the through holes 114.

The second ring 104 is formed in a ring shape, and relatively non-rotatable and relatively movable in the axial direction of the output shaft 22, which is disposed on the inner peripheral side of the second ring 104, with respect to the output shaft 22.

The second ring 104 is provided with three third meshing teeth 116 that project toward the shifting gear 30 on the side (right side on the drawing sheet surface) of the shifting gear 30 which is adjacent in the direction of the rotational axis CL1. The third meshing teeth 116 are provided at equal angular intervals in the circumferential direction of the second ring 104. The third meshing teeth 116 are provided with third housing holes 117 that house the springs 106. The third meshing teeth 116 are an example of the first meshing teeth according to the present disclosure.

A surface of the second ring 104 that faces the first ring 102 in the direction of the rotational axis CL1 is provided with three second meshing teeth 118 that project toward the first ring 102. The fourth meshing teeth 118 are provided at equal angular intervals in the circumferential direction of the second ring 104. The fourth meshing teeth 118 are provided so as to project from the first ring 102 while penetrating the through holes 114, which are provided in the first ring 102, when the first ring 102 and the second ring 104 are in the assembled state. An inclined surface 124 is provided on the fourth meshing teeth 118 toward the rearward rotational direction. The inclined surface 124 is inclined in the direction of approaching the second ring 104 toward the rearward rotational direction (see FIGS. 6A to 6D). The fourth meshing teeth 118 are an example of the second meshing teeth according to the present disclosure.

The second ring 104 is provided with three through holes 120 that penetrate the second ring 104 in the direction of the rotational axis CL1. The through holes 120 are positioned and shaped so as to be penetrated by the second meshing teeth 110 of the first ring 102 when the first ring 102 and the second ring 104 are in the assembled state. Three fourth housing holes 122 that house the springs 106 are provided adjacent to the through holes 120 in the circumferential direction of the second ring 104. The fourth housing holes 122 are provided on the side in the rearward rotational direction with respect to the through holes 120.

In the second embodiment, the first meshing teeth 108 and the third meshing teeth 116 are positioned as shifted by 60 degrees in the circumferential direction when the first ring 102 and the second ring 104 are in the assembled state. FIGS. 6A to 6D are each a development view in which a part of the dog ring 100 in the circumferential direction is developed in plan. In FIGS. 6A to 6D, the right side of the drawing sheet surface corresponds to the forward rotational direction, and the left side of the drawing sheet surface corresponds to the rearward rotational direction.

Figure 6A:
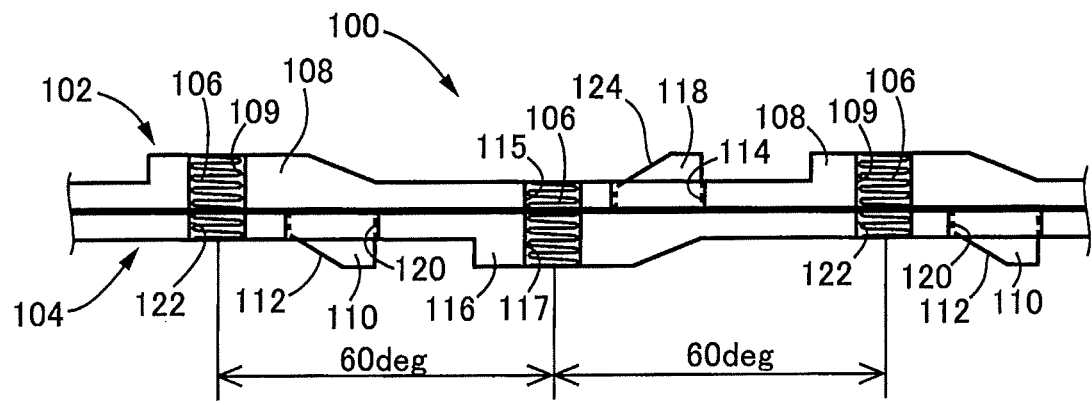
FIG. 6A is a development view in which a part of the dog ring in FIG. 5 in the circumferential direction is developed in plan, chronologically illustrating a state in a transient period in which gear-side meshing teeth are meshed with first meshing teeth of a first dog ring with an engine in a driving state.

FIG. 6A illustrates the first ring 102 and the second ring 104 in the assembled state. As illustrated in FIG. 6A, the first meshing teeth 108 and the third meshing teeth 116 are positioned as shifted by 60 degrees in the circumferential direction when the first ring 102 and the second ring 104 are in the assembled state. In association, the second meshing teeth 110 and the fourth meshing teeth 118 are also positioned as shifted by 60 degrees in the circumferential direction.

The dimensions (dimensions in the right-left direction on the drawing sheet surface in FIGS. 6A to 6D) of the second meshing teeth 110 and the fourth meshing teeth 118 in the circumferential direction are smaller than those of the dog ring 28 according to the first embodiment discussed earlier, and the first meshing teeth 108 and the fourth meshing teeth 118 are positioned away from each other in the circumferential direction (rotational direction) when the first ring 102 and the second ring 104 are in the assembled state. Further, the second meshing teeth 110 and the third meshing teeth 116 are positioned away from each other in the circumferential direction when the first ring 102 and the second ring 104 are in the assembled state.

As illustrated in FIG. 6A, when the first ring 102 and the second ring 104 are in the assembled state, and when the dog ring 100 is seen in the direction of the rotational axis CL1, the positions of the first housing holes 109 of the first ring 102 coincide with the positions of the fourth housing holes 122 of the second ring 104, and the positions of the second housing holes 115 of the first ring 102 coincide with the positions of the third housing holes 17 of the second ring 104.

Thus, when the first ring 102 and the second ring 104 are in the assembled state, the dog ring 100 is formed with spaces for housing the springs 106 by the first housing holes 109 and the fourth housing holes 122, and the springs 106 are provided in such spaces. When the first ring 102 and the second ring 104 are in the assembled state, the dog ring 100 is formed with spaces for housing the springs 106 by the second housing holes 115 and the third housing holes 117, and the springs 106 are provided in such spaces.

As illustrated in FIG. 6A, when the first ring 102 and the second ring 104 are in the assembled state, the first meshing teeth 108 and the fourth meshing teeth 118 are positioned away from each other in the circumferential direction (rotational direction), and the springs 106 are provided between the first meshing teeth 108 and the fourth meshing teeth 118 in the circumferential direction. Thus, the springs 106 are provided also between the first meshing teeth 108 and the fourth meshing teeth 118, in addition to the springs 106 which are provided inside the first meshing teeth 108. When the first ring 102 and the second ring 104 are in the assembled state, the second meshing teeth 110 and the third meshing teeth 116 are positioned away from each other in the circumferential direction (rotational direction), and the springs 106 are provided between the second meshing teeth 110 and the third meshing teeth 116 in the circumferential direction. Thus, the springs 106 are provided also between the third meshing teeth 116 and the second meshing teeth 110, in addition to the springs 106 which are provided inside the third meshing teeth 116.

In the dog ring 100 configured as described above, the springs 106 are provided inside the first meshing teeth 108 of the first ring 102, and further the springs 106 are provided also between the first meshing teeth 108 which are adjacent to each other in the circumferential direction. The springs 106 are provided inside the third meshing teeth 116 of the second ring 104, and further the springs 106 are provided also between the third meshing teeth 116 which are adjacent to each other in the circumferential direction. Thus, the number of the springs 106 in the dog ring 100 is six, which is larger than the number of the springs 54 in the dog ring 28 according to the first embodiment discussed earlier, which is three. As a result, the force of the springs 106 to couple the first ring 102 and the second ring 104 to each other can be increased, which increases the width of adjustment of the coupling force between the first ring 102 and the second ring 104.

Figure 6B:
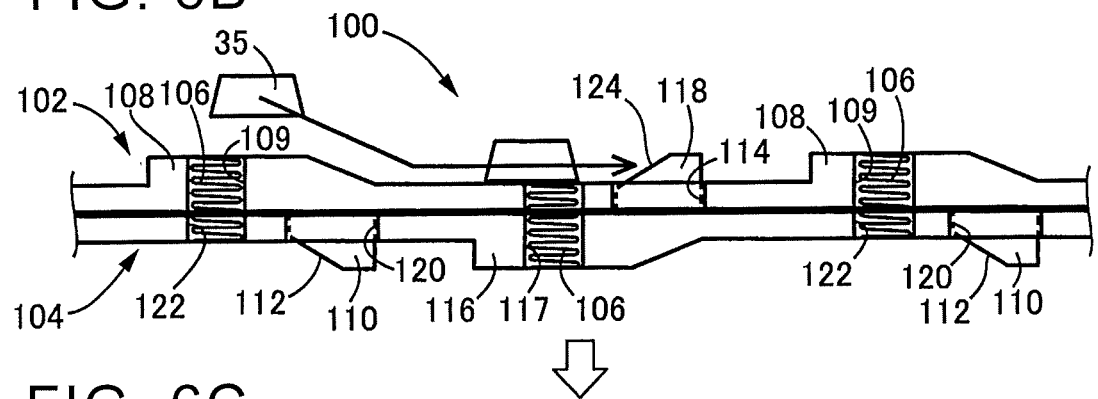
FIG. 6B is a development view in which a part of the dog ring in FIG. 5 in the circumferential direction is developed in plan, chronologically illustrating a state in the transient period in which the gear-side meshing teeth are meshed with the first meshing teeth of the first dog ring with the engine in the driving state.
Figure 6C:
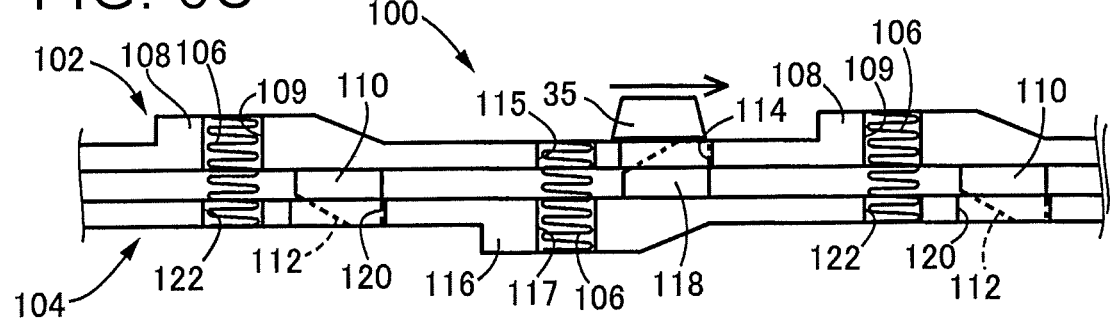
FIG. 6C is a development view in which a part of the dog ring in FIG. 5 in the circumferential direction is developed in plan, chronologically illustrating a state in the transient period in which the gear-side meshing teeth are meshed with the first meshing teeth of the first dog ring with the engine in the driving state.
Figure 6D:
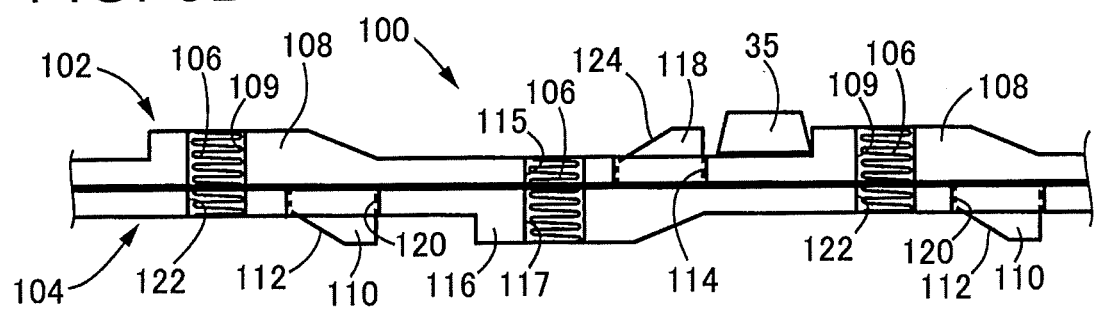
FIG. 6D is a development view in which a part of the dog ring in FIG. 5 in the circumferential direction is developed in plan, chronologically illustrating a state in the transient period in which the gear-side meshing teeth are meshed with the first meshing teeth of the first dog ring with the engine in the driving state.

Next, operation of the dog ring 100 in a transient period of meshing between the gear-side meshing teeth 35 and the first meshing teeth 108 of the first ring 102 will be described with reference to FIGS. 6B to 6D. FIGS. 6B to 6D chronologically illustrate a state in a transient period in which the gear-side meshing teeth 35 are meshed with the first meshing teeth 108 of the first ring 102 with the engine 12 in a drive state. In the initial state in which meshing is started illustrated in FIG. 6B, the gear-side meshing teeth 35 are moved toward the dog ring 100. When the gear-side meshing teeth 35 abut against the first ring 102, the gear-side meshing teeth 35 are moved toward the right side on the drawing sheet surface while abutting against the first ring 102, since the rotational speed of the gear-side meshing teeth 35 is higher than that of the dog ring 100.

FIG. 6C illustrates a state in which the gear-side meshing teeth 35 are moved toward the right side on the drawing sheet surface while pushing aside the fourth meshing teeth 118. When the gear-side meshing teeth 35 are further moved toward the right side on the drawing sheet surface from the state illustrated in FIG. 6B, the gear-side meshing teeth 35 abut against the inclined surface 124 which is provided on the fourth meshing teeth 118 toward the rearward rotational direction. At this time, when the inclined surface 124 is pushed against the gear-side meshing teeth 35, the fourth meshing teeth 118 are pushed aside so that the springs 106 are elastically deformed, and the second ring 104 is separated from the first ring 102 as illustrated in FIG. 6C. In this manner, since the inclined surface 124 which extends in a direction of approaching the second ring 104 toward the rearward rotational direction is provided on the fourth meshing teeth 118 toward the rearward rotational direction in the rotational direction, movement of the gear-side meshing teeth 35 is not obstructed with the gear-side meshing teeth 35 meshed with the fourth meshing teeth 118.

FIG. 6D illustrates a state in which the gear-side meshing teeth 35 are meshed with the first meshing teeth 108. When the gear-side meshing teeth 35 are further moved toward the right side on the drawing sheet surface in FIG. 6C, the gear-side meshing teeth 35 are meshed with the first meshing teeth 108. At this time, abutment between the gear-side meshing teeth 35 and the fourth meshing teeth 118 is canceled. Therefore, the second ring 104 is drawn toward the first ring 102 by the elastic restoring force of the springs 106 to establish an assembled state in which the first ring 102 and the second ring 104 abut against each other. Consequently, the gear-side meshing teeth 35 and the first meshing teeth 108 are meshed with each other, which enables power transfer between the gear-side meshing teeth 35 and the first meshing teeth 108. The clearance in the circumferential direction between the first meshing teeth 108 and the fourth meshing teeth 118 for accommodating the gear-side meshing teeth 35 illustrated in FIG. 6D has dimensions that enable the gear-side meshing teeth 35 to be accommodated. Specifically, the clearance is set to a value obtained by adding an allowance set in advance to the width of the gear-side meshing teeth 35 in the circumferential direction. Thus, abutment between the gear-side meshing teeth 35 and the fourth meshing teeth 118 is canceled with the gear-side meshing teeth 35 and the first meshing teeth 108 meshed with each other.

In the dog ring 100 according to the second embodiment, as discussed above, the springs 106 are provided inside the first meshing teeth 108 and the third meshing teeth 116, and the springs 106 are provided on the inner peripheral side with respect to a portion of the meshing teeth 108, 110, 116, and 118 positioned on the outermost peripheral side from the rotational axis CL1. Thus, the springs 106 are not provided on the outer peripheral side with respect to the meshing teeth 108, 110, 116, and 118, which reduces the outside diameter of the dog ring 100.

When the first ring 102 and the second ring 104 are in the assembled state, the first meshing teeth 108 and the fourth meshing teeth 118 are positioned away from each other in the rotational direction, and therefore the springs 106 are further provided between the first meshing teeth 108 and the fourth meshing teeth 118. When the first ring 102 and the second ring 104 are in the assembled state, the second meshing teeth 110 and the third meshing teeth 116 are positioned away from each other in the rotational direction, and therefore the springs 106 are further provided between the second meshing teeth 110 and the third meshing teeth 116. Thus, the number of the springs 106 can be increased compared to the number of the springs 54 of the dog ring 28. As a result, the width of adjustment of the force of the springs 106 to couple the first ring 102 and the second ring 104 to each other is increased. With the number of the springs 106 between the first ring 102 and the second ring 104 increased, the coupling force which acts between the first ring 102 and the second ring 104 can be distributed generally uniformly in the circumferential direction, which improves the reliability of the dog ring 100.

Figure 7:
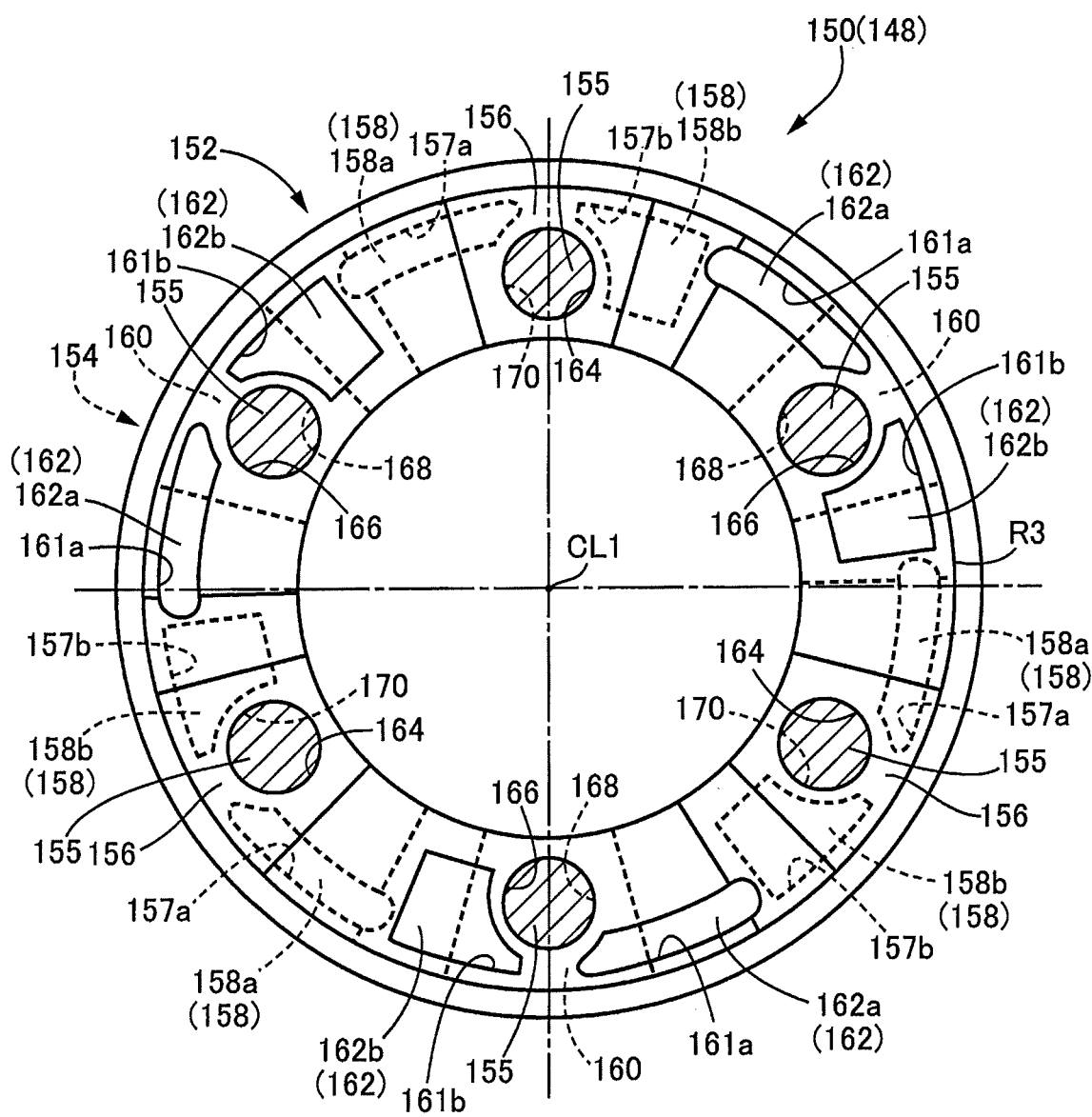
FIG. 7 illustrates a dog ring according to a third embodiment of the present disclosure as seen in the direction of the rotational axis.

FIG. 7 illustrates a dog ring 150 that constitutes a dog clutch 148 according to a third embodiment of the present disclosure as seen in the direction of the rotational axis CL1. In FIG. 7, a first ring 152 is disposed on the front side of the drawing sheet surface, and a second ring 154 is disposed on the back side of the drawing sheet surface. In FIG. 7, members disposed on the back side of the drawing sheet surface are indicated by the dashed lines. Both the first ring 152 and the second ring 154 are formed in a ring shape, and rotatable about the rotational axis CL1. Six springs 155 are interposed between the first ring 152 and the second ring 154. The six springs 155 are disposed at equal intervals over the circumference of the first ring 152 and the second ring 154 to couple the first ring 152 and the second ring 154 to each other, and stably bias the first ring 152 and the second ring 154 in the direction of drawing each other.

The first ring 152 is provided with three first meshing teeth 156 that project toward the shifting gear 30 which is adjacent to the first ring 152. The first meshing teeth 156 are provided at equal angular intervals in the circumferential direction. The first ring 152 is provided with three second meshing teeth 158 that project toward the shifting gear 30 which is adjacent to the second ring 154 while penetrating through holes 157a and 157b formed in the second ring 154.

The second meshing teeth 158 are each constituted from a first split tooth 158a and a second split tooth 158b split in the circumferential direction (rotational direction). The first split tooth 158a and the second split tooth 158b are positioned generally behind the first meshing teeth 156. A gap in the circumferential direction provided between the first split tooth 158a and the second split tooth 158b is smaller than the width of the gear-side meshing teeth 35 in the rotational direction.

The second ring 154 is provided with three third meshing teeth 160 that project toward the shifting gear 30 which is adjacent to the second ring 154. The third meshing teeth 160 are provided at equal angular intervals in the circumferential direction. The second ring 154 is provided with three fourth meshing teeth 162 that project toward the shifting gear 30 which is adjacent to the first ring 152 while penetrating through holes 161a and 161b formed in the first ring 152. The third meshing teeth 160 are an example of the first meshing teeth according to the present disclosure. The fourth meshing teeth 162 are an example of the second meshing teeth according to the present disclosure.

The fourth meshing teeth 162 are each constituted from a first split tooth 162a and a second split tooth 162b split in the circumferential direction (rotational direction). The first split tooth 162a and the second split tooth 162b are positioned generally behind the third meshing teeth 160. A gap in the circumferential direction provided between the first split tooth 162a and the second split tooth 162b is smaller than the width of the gear-side meshing teeth 35 in the rotational direction.

The springs 155 are interposed between the first ring 152 and the second ring 154 to couple such rings to each other. The springs 155 are provided inside the first meshing teeth 156 and in gaps between the first split tooth 162a and the second split tooth 162b of the fourth meshing teeth 162 as seen in the direction of the rotational axis CL1 from the side of the first ring 152 when the first ring 152 and the second ring 154 are in the assembled state. In this manner, the springs 155 are provided not only inside the first meshing teeth 156 but also between the first split tooth 162a and the second split tooth 162b of the fourth meshing teeth 162, which increases the number of the springs 155 compared to the dog ring 28 discussed earlier.

First housing holes 164 that house the springs 155 are provided at portions of the first ring 152 at which the first meshing teeth 156 are provided. Further, second housing holes 166 that house the springs 155 are provided at positions shifted by 60 degrees in the circumferential direction with respect to the first housing holes 164 of the first ring 152. The first housing holes 164 and the second housing holes 166 are formed alternately at equal angular intervals (specifically, intervals of 60 degrees) in the circumferential direction of the first ring 152. The second housing holes 166 are each provided between two through holes 161a and 161b, through which the first split tooth 162a and the second split tooth 162b of the fourth meshing teeth 162 are inserted in the assembled state.

Third housing holes 168 that house the springs 155 are formed at portions of the second ring 154 at which the third meshing teeth 160 are provided. Further, fourth housing holes 170 that house the springs 155 are formed at positions shifted by 60 degrees in the circumferential direction with respect to the third housing holes 168 of the second ring 154. The third housing holes 168 and the fourth housing holes 170 are formed alternately at equal angular intervals (specifically, intervals of 60 degrees) in the circumferential direction of the second ring 154. The fourth housing holes 170 are each formed between two through holes 157a and 157b, through which the first split tooth 158a and the second split tooth 158b of the second meshing teeth 158 are inserted in the assembled state. The first to fourth housing holes 164 to 170 have the same hole diameter.

When the dog ring 150 is seen in the direction of the rotational axis CL1, the first housing holes 164 and the fourth housing holes 170 overlap each other, and the second housing holes 166 and the third housing holes 168 overlap each other. That is, when the first ring 152 and the second ring 154 are in the assembled state, and when the dog ring 150 is seen in the direction of the rotational axis CL1, the first housing holes 164 and the fourth housing holes 170 are formed at the same position, and the second housing holes 166 and the third housing holes 168 are formed at the same position.

In this manner, when the first ring 152 and the second ring 154 are in the assembled state, spaces for housing the springs 155 are formed by the first housing holes 164 and the fourth housing holes 170, and the springs 155 are provided in such spaces. Spaces for housing the springs 155 are formed by the second housing holes 166 and the third housing holes 168, and the springs 155 are provided in such spaces.

As illustrated in FIG. 7, the springs 155 are provided on the inner peripheral side with respect to a circle R3 that is centered on the rotational axis CL1 and that circumscribes a portion of the meshing teeth 156, 158, 160, and 162 positioned on the outermost peripheral side (outer peripheral portion of the first meshing teeth 156 and the third meshing teeth 160). Consequently, the springs 155 are not disposed on the outer peripheral side with respect to the meshing teeth 156, 158, 160, and 162, and therefore the dog ring 150 is configured to be reduced in size compared to a case where the springs 155 are disposed on the outer peripheral side of the meshing teeth 156, 158, 160, and 162.

FIGS. 8A to 8E chronologically illustrate a state in a transient period in which the gear-side meshing teeth 35 of the shifting gear 30 which is adjacent to the first ring 152 are meshed with the first meshing teeth 156 of the dog ring 150 with the engine 12 in a drive state. FIGS. 8A to 8E are each a view in which a part of the dog ring 150 in the circumferential direction is developed in plan. In FIGS. 8A to 8E, the right side of the drawing sheet surface corresponds to the forward rotational direction, and the left side of the drawing sheet surface corresponds to the rearward rotational direction.

As illustrated in FIGS. 8A to 8E, the springs 155 are provided in spaces formed by the first housing holes 164 which are formed in the first meshing teeth 156 of the first ring 152 and the fourth housing holes 170 of the second ring 154. The springs 155 are provided in spaces formed by the second housing holes 166 of the first ring 152 and the third housing holes 168 which are formed in the third meshing teeth 160 of the second ring 154. Consequently, the springs 155 are provided in the gaps between the first split tooth 158a and the second split tooth 158b of the second meshing teeth 158, and the springs 155 are provided in the gaps between the first split tooth 162a and the second split tooth 162b of the fourth meshing teeth 162.

In this manner, when the first ring 152 is seen in the direction of the rotational axis CL1, the springs 155 are provided not only inside the first meshing teeth 156 but also between the first split tooth 162a and the second split tooth 162b of the fourth meshing teeth 162, which increases the number of the springs 155 compared to the dog ring 28. When the second ring 154 is seen in the direction of the rotational axis CL1, meanwhile, the springs 155 are provided not only inside the third meshing teeth 160 but also between the first split tooth 158a and the second split tooth 158b of the second meshing teeth 158, which increases the number of the springs 155 compared to the dog ring 28.

FIG. 8A illustrates the initial state in which meshing is started. When meshing is started, the gear-side meshing teeth 35 are moved toward the dog ring 150. At this time, the gear-side meshing teeth 35 do not abut against any of the meshing teeth of the dog ring 150. Thus, the first ring 152 and the second ring 154 are drawn toward each other by the biasing force of the springs 155 to be brought into the assembled state in which respective surfaces of the first ring 152 and the second ring 154 that face each other abut against each other.

FIG. 8B illustrates a state in which the gear-side meshing teeth 35 abut against the first split tooth 162a of the fourth meshing teeth 162 and further the springs 155 are gradually elastically deformed with the gear-side meshing teeth 35 pushed against the first split tooth 162a. Consequently, the first ring 152 and the second ring 154 are gradually separated from each other.

FIG. 8C illustrates a state in which the gear-side meshing teeth 35 abut against a flat surface of the first ring 152. At this time, the fourth meshing teeth 162 are moved toward the second ring 154 by the gear-side meshing teeth 35 to be housed inside the through holes 161a and 161b of the first ring 152, which maximizes the amount of separation between the first ring 152 and the second ring 154.

FIG. 8D illustrates a state in which the gear-side meshing teeth 35 are further moved toward the right side on the drawing sheet surface from the state in FIG. 8C. In the state illustrated in FIG. 8D, the gear-side meshing teeth 35 abut against the first split tooth 162a and the second split tooth 162b of the fourth meshing teeth 162. Consequently, a state in which the fourth meshing teeth 162 are pushed in by the gear-side meshing teeth 35 is maintained. The state in which the fourth meshing teeth 162 are pushed in by the gear-side meshing teeth 35 can be maintained since a width W1 of the gear-side meshing teeth 35 in the rotational direction is larger than a width W2 of a gap in the rotational direction formed between the first split tooth 162a and the second split tooth 162b (W1>W2). Thus, the first split tooth 162a and the second split tooth 162b can be prevented from being pushed back by the elastic restoring force of the springs 155 with the gear-side meshing teeth 35 entering the space between the first split tooth 162a and the second split tooth 162b.

FIG. 8E illustrates a state in which the gear-side meshing teeth 35 are meshed with the first meshing teeth 156 with the gear-side meshing teeth 35 in FIG. 8D further moved toward the right side on the drawing sheet surface. At this time, abutment between the gear-side meshing teeth 35 and the fourth meshing teeth 162 is canceled. Therefore, the second ring 154 is moved toward the first ring 152 by the elastic restoring force of the springs 155. In this manner, during forward rotation, power can be transferred between the gear-side meshing teeth 35 and the first meshing teeth 156 which are positioned on the side in the forward rotational direction.

Even in the case where the width W1 of the gear-side meshing teeth 35 is smaller than the width W2 of the gap between the first split tooth 162a and the second split tooth 162b, the state in which the fourth meshing teeth 162 are pushed in during the meshing transient period can be maintained by adjusting a difference ΔH in the height between the first split tooth 162a and the second split tooth 162b.

Figure 9:
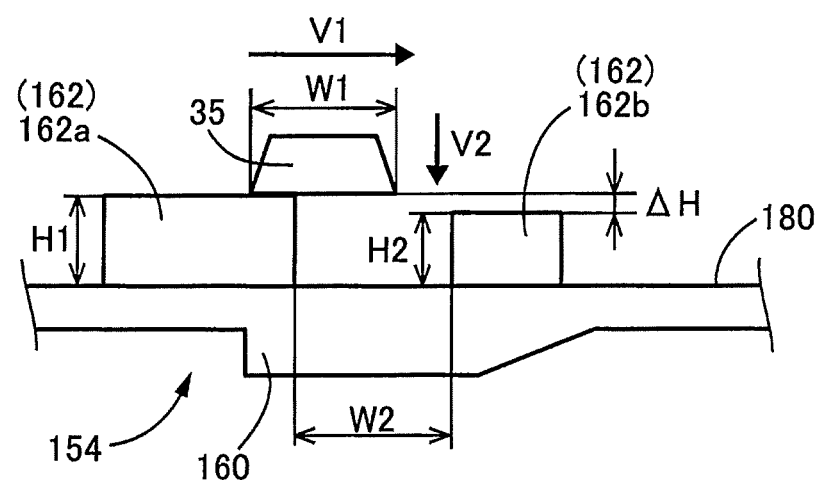
FIG. 9 illustrates a different aspect of a first split tooth and a second split tooth of fourth meshing teeth of the dog ring in FIG. 7.

FIG. 9 is a development view in which the second ring 154 is developed in plan, illustrating a portion in which the first split tooth 162a and the second split tooth 162b of the fourth meshing teeth 162 are provided in the circumferential direction. In the fourth meshing teeth 162 in FIG. 9, the width W2 of a gap in the rotational direction formed between the first split tooth 162a and the second split tooth 162b is larger than the width W1 of the gear-side meshing teeth 35. A height H1 of the first split tooth 162a from a flat surface 180 formed on the second ring 154 is larger than a height H2 of the second split tooth 162b.

A difference ΔH (H1−H2) in the height between the first split tooth 162a and the second split tooth 162b is set so as to meet the following formula (1). In the formula (1), V1 corresponds to the relative rotational speed between the gear-side meshing teeth 35 and the second ring 154, and V2 corresponds to the relative movement speed (relative shift speed) of the gear-side meshing teeth 35 at the time when the gear-side meshing teeth 35 move toward the second ring 154. A minimum value of the relative rotational speed V1 assumed during travel of the vehicle is applied as a representative value of the relative rotational speed V1. The movement speed V2 is a value calculated through design in advance on the basis of the rotational speed of the barrel 40 etc.

$$\Delta H > \{(W2-W1)/V1\} \times V2 \qquad (1)$$

With the height difference ΔH set to a value that meets the formula (1), the gear-side meshing teeth 35 can transition from a state in which the gear-side meshing teeth 35 abut against the first split tooth 162a to a state in which the gear-side meshing teeth 35 abut against the second split tooth 162b in the meshing transient period, and a state in which the gear-side meshing teeth 35 are pushed against the fourth meshing teeth 162 can be maintained.

Also with the dog ring 150 discussed above, the same effect as the first and second embodiments discussed earlier can be obtained. That is, the springs 155 are provided inside the first meshing teeth 156 and the third meshing teeth 160, and the springs 155 are provided on the inner peripheral side with respect to a portion of the meshing teeth 156, 158, 160, and 162 positioned on the outermost peripheral side from the rotational axis CL1. Thus, the springs 155 are provided on the inner peripheral side with respect to the meshing teeth 156, 158, 160, and 162. Thus, the outside diameter of the dog ring 150 can be reduced. In the dog ring 150, the second meshing teeth 158 and the fourth meshing teeth 162 are constituted as split, and the number of the springs 155 can be increased compared to the dog ring 28 by providing the springs 155 in the gaps between the first split teeth 158a and 162a and the second split teeth 158b and 162b which are split. Consequently, the width of adjustment of the force of the springs 155 to couple the first ring 152 and the second ring 154 to each other is increased. The coupling force between the first ring 152 and the second ring 154 can be distributed generally uniformly in the circumferential direction, which improves the reliability of the dog ring 150.

While embodiments of the present disclosure have been described in detail above with reference to the drawings, the present disclosure is also applicable to other aspects.

For example, in each of the embodiments discussed earlier, the transmission 10 enables shifting among six forward speeds. However, the number of gear stages is not necessarily limited to six. The number of gear stages of the transmission is changeable, as appropriate, to five forward speeds, for example.

In the first embodiment discussed earlier, the dog ring 28 is provided with three springs 54. However, the number of the springs 54 is not necessarily limited to three. The number of the springs 54 is changeable, as appropriate, in accordance with the design conditions. Likewise, the number of the springs 106 of the dog ring 100 and the number of the springs 155 of the dog ring 150 are also changeable, as appropriate, in accordance with the design conditions.

In each of the embodiments discussed earlier, the dog rings 28, 100, and 150 each include three first meshing teeth 58, 108, and 156, three second meshing teeth 60, 110, and 158, three third meshing teeth 64, 116, and 160, and three fourth meshing teeth 68, 118, and 162, respectively. However, the number of meshing teeth is not necessarily limited to three, and is changeable, as appropriate, in accordance with the design conditions.

In the dog ring 100 according to the second embodiment discussed earlier, either the springs 106 which are provided inside the first meshing teeth 108 or the springs which are provided inside the third meshing teeth 116 may be omitted. In the dog ring 150 according to the third embodiment discussed earlier, either the springs 155 which are provided inside the first meshing teeth 156 or the springs which are provided inside the third meshing teeth 160 may be omitted.

In the dog rings 28, 100, and 150 according to the embodiments discussed earlier, meshing teeth are provided on both sides in the axial direction of the output shaft 22. However, meshing teeth may be provided on only one side in the axial direction of the output shaft 22.

In the dog ring 28 according to the first embodiment discussed earlier, the positions of the springs 54 are changeable, as appropriate, in the range on the inner peripheral side of the circle R2 which is centered on the rotational axis CL1 unless any contradiction occurs. The same also applies to the dog rings 100 and 150.

The above discussion merely introduces embodiments, and the present disclosure can be implemented in aspects in which a variety of modifications and improvements are made on the basis of the knowledge of a person skilled in the art.

What is claimed is:

1. A dog clutch for a vehicle, comprising:
    gear-side meshing teeth provided on a shifting gear fitted so as to be rotatable relative to a shaft; and
    a dog ring disposed adjacent to the shifting gear in an axial direction of the shaft, wherein:
    the dog ring is disposed so as to be non-rotatable relative to the shaft;
    the dog ring includes a first ring that is relatively movable in the axial direction of the shaft, a second ring disposed with the first ring interposed between the shifting gear and the second ring in the axial direction of the shaft, the second ring being non-rotatable relative to the shaft and relatively movable in the axial direction of the shaft, and a spring interposed between the first ring and the second ring;
    the first ring is provided with first meshing teeth that project toward the shifting gear in the axial direction of the shaft and that are configured to be meshed with the gear-side meshing teeth of the shifting gear;
    the second ring is provided with second meshing teeth that project toward the shifting gear while penetrating the first ring in the axial direction of the shaft and that are configured to be meshed with the gear-side meshing teeth of the shifting gear; and
    the spring is provided on an inner peripheral side with respect to a circle that is centered on the shaft and a radius of which is defined by a radially outermost portion of the first meshing teeth and the second meshing teeth with respect to a center of the shaft, so that the spring is positioned radially inwardly with respect to said radially outermost portion of the first meshing teeth and the second meshing teeth.

2. The dog clutch for the vehicle according to claim 1, wherein the spring is provided inside the first meshing teeth of the first ring.

3. The dog clutch for the vehicle according to claim 1, wherein:
    the first meshing teeth of the first ring and the second meshing teeth of the second ring are positioned away from each other in a rotational direction in an assembled state;
    an inclined surface is provided on the second meshing teeth of the second ring toward a rearward rotational direction in the rotational direction; and
    the spring is provided between the first meshing teeth of the first ring and the second meshing teeth of the second ring in the rotational direction.

4. The dog clutch for the vehicle according to claim 1, wherein:
    the second meshing teeth of the second ring are each constituted from a first split tooth and a second split tooth split in a rotational direction; and the spring is provided between the first split tooth and the second split tooth in the rotational direction.

5. The dog clutch for the vehicle according to claim 1, wherein the dog ring includes a plurality of the springs and the number of the springs is three.

6. The dog clutch for the vehicle according to claim 1, wherein the dog ring includes a plurality of the springs and the number of the springs is six.

* * * * *